(12) United States Patent
Reilly

(10) Patent No.: US 12,322,014 B2
(45) Date of Patent: Jun. 3, 2025

(54) INTERACTIVE VIRTUAL REALITY BROADCAST SYSTEMS AND METHODS

(71) Applicant: TPHOENIXSMR LLC, Southfield, MI (US)

(72) Inventor: Scott Reilly, Southfield, MI (US)

(73) Assignee: TPHOENIXSMR LLC, Southfield, MI (US)

( * ) Notice: Subject to any disclaimer, the term of this patent is extended or adjusted under 35 U.S.C. 154(b) by 0 days.

(21) Appl. No.: 18/928,242

(22) Filed: Oct. 28, 2024

(65) Prior Publication Data

US 2025/0054216 A1 Feb. 13, 2025

Related U.S. Application Data

(63) Continuation of application No. 17/706,872, filed on Mar. 29, 2022, now Pat. No. 12,136,157, which is a
(Continued)

(51) Int. Cl.
*G06T 13/20* (2011.01)
*G01P 13/00* (2006.01)
(Continued)

(52) U.S. Cl.
CPC ............ *G06T 13/205* (2013.01); *G01P 13/00* (2013.01); *G01S 17/58* (2013.01); *G03H 1/0005* (2013.01);
(Continued)

(58) Field of Classification Search
None
See application file for complete search history.

(56) References Cited

U.S. PATENT DOCUMENTS 6,409,599 B1 6/2002 Sprout et al.
9,325,972 B2 4/2016 Griffin
(Continued)

FOREIGN PATENT DOCUMENTS

CA 2357291 A1 3/2003
CN 101690150 A 3/2010
(Continued)

OTHER PUBLICATIONS

4th Immersion: Towards new Cooperation Possibilities in Improv Theatre using Virtual Reality, M. Singh et al., www.researchgate.com, Aug. 2019.
(Continued)

*Primary Examiner* — Ryan M Gray
(74) *Attorney, Agent, or Firm* — Harness, Dickey & Pierce, P.L.C.

(57) ABSTRACT

A method for generating a virtual reality (VR) broadcast of a VR performance is provided. The VR broadcast is received by audience devices that receive audience feedback data. A VR system controller synchronizes the audience feedback data with the VR broadcast to generate synchronized audience feedback data in real time and outputs the VR broadcast with the synchronized audience feedback data to the audience devices. The VR system controller receives performer feedback data and transmits performer feedback data to the audience devices.

18 Claims, 19 Drawing Sheets

Related U.S. Application Data continuation of application No. 17/073,640, filed on Oct. 19, 2020, now Pat. No. 11,321,892.

(60) Provisional application No. 63/046,260, filed on Jun. 30, 2020, provisional application No. 63/028,103, filed on May 21, 2020.

(51) Int. Cl.

| | | |
|---|---|---|
| *G01S 17/58* | (2006.01) | |
| *G03H 1/00* | (2006.01) | |
| *G06F 3/01* | (2006.01) | |
| *G06F 3/04815* | (2022.01) | |
| *G06F 3/14* | (2006.01) | |
| *G06T 7/246* | (2017.01) | |
| *G06T 19/00* | (2011.01) | |
| *G06T 19/20* | (2011.01) | |
| *G06V 40/16* | (2022.01) | |
| *H04L 65/60* | (2022.01) | |
| *H04N 23/90* | (2023.01) | |
| *H04R 3/00* | (2006.01) | |

(52) U.S. Cl.
CPC .............. *G06F 3/012* (2013.01); *G06F 3/013* (2013.01); *G06F 3/04815* (2013.01); *G06F 3/1454* (2013.01); *G06T 7/246* (2017.01); *G06T 19/006* (2013.01); *G06T 19/20* (2013.01); *G06V 40/174* (2022.01); *H04L 65/60* (2013.01); *H04N 23/90* (2023.01); *H04R 3/005* (2013.01); *G03H 2001/0088* (2013.01); *G06F 2203/04806* (2013.01); *G06T 2200/24* (2013.01); *G06T 2207/10016* (2013.01); *G06T 2207/30196* (2013.01); *G06T 2207/30204* (2013.01); *G06T 2219/024* (2013.01); *G06T 2219/2016* (2013.01)

(56) References Cited

U.S. PATENT DOCUMENTS

| | | |
|---|---|---|
| 10,621,784 B2 | 4/2020 | Khan et al. |
| 10,917,613 B1 | 2/2021 | Chiarella et al. |
| 11,102,602 B1 | 8/2021 | Brimijoin et al. |
| 12,136,157 B2* | 11/2024 | Reilly .................... H04N 23/90 |
| 2008/0307304 A1 | 12/2008 | Feiler et al. |
| 2009/0143139 A1 | 6/2009 | Fawcett |
| 2012/0130717 A1 | 5/2012 | Xu et al. |
| 2018/0077407 A1 | 3/2018 | Young |
| 2018/0129276 A1 | 5/2018 | Nguyen et al. |
| 2018/0338213 A1 | 11/2018 | Lehtiniemi et al. |
| 2019/0099678 A1 | 4/2019 | Khan et al. |
| 2019/0188895 A1 | 6/2019 | Miller, IV et al. |
| 2019/0265945 A1 | 8/2019 | Newell et al. |
| 2019/0281343 A1* | 9/2019 | Hussain ................ A63F 13/352 |
| 2019/0385412 A1* | 12/2019 | Piccionielli ......... G07F 17/3272 |
| 2020/0090392 A1 | 3/2020 | Chou et al. |
| 2020/0365044 A1 | 11/2020 | Trim et al. |
| 2020/0404219 A1* | 12/2020 | Yerli ....................... G06T 19/20 |
| 2020/0404344 A1 | 12/2020 | Bathory |
| 2021/0011292 A1* | 1/2021 | Nakata ................ H04N 23/698 |
| 2021/0287416 A1 | 9/2021 | O'Hagan et al. |
| 2022/0353563 A1* | 11/2022 | Xing ................ H04N 21/47205 |

FOREIGN PATENT DOCUMENTS

| | | |
|---|---|---|
| CN | 106993195 A | 7/2017 |
| CN | 107438183 A | 12/2017 |
| CN | 110650354 A | 1/2020 |
| JP | 2017151978 A | 8/2017 |
| KR | 20150105058 A | 9/2015 |
| WO | WO-2013024364 A2 | 2/2013 |
| WO | WO-2015082557 A1 | 6/2015 |

OTHER PUBLICATIONS

Turchet, Luca, Carlo Fischione, Georg Essl, Damian Keller, and Mathieu Barthet. Internet of musical things: Vision and challenges. Ieee access 6 (Sep. 28, 2018): 61994-62017. (Year: 2018).

\* cited by examiner

INTERACTIVE VIRTUAL REALITY BROADCAST SYSTEMS AND METHODS

CROSS-REFERENCE TO RELATED APPLICATIONS

This application is a continuation of U.S. application Ser. No. 17/706,872, filed Mar. 29, 2022, which is a continuation of U.S. application Ser. No. 17/073,640 filed Oct. 19, 2020, now U.S. Pat. No. 11,321,892, which claims the benefit of U.S. Provisional Application No. 63/028,103, filed on May 21, 2020, and of U.S. Provisional Application No. 63/046,260, filed on Jun. 30, 2020. The entire disclosures of each of the above applications are incorporated herein by reference.

FIELD

The present disclosure relates to interactive virtual reality broadcast systems and methods and, more particularly, to interactive virtual reality broadcast systems and methods that generate a live virtual reality broadcast of three-dimensional virtual reality avatars performing with instruments in a virtual reality performance area.

BACKGROUND

This section provides background information related to the present disclosure which is not necessarily prior art.

Live musical performances, such as live orchestral performances at a concert hall, have long been an exciting and enjoyable experience for both the audience members watching and listening to the musical performance as well as the musicians that are performing for the audience. During a live musical performance, the audience members and the musicians often share a special bond resulting from the interaction between the musicians creating the live music and the audience members viscerally reacting as they hear the music and watch the performance. Musicians often feed off of the energy of the audience and the audience members are able to participate in the creation of the music being performed as they watch and react to the facial expressions and body movements of the performers. This interaction between the musicians and the audience makes the live musical performance an engaging and memorable experience for both the musicians and performers and the audience members.

During an epidemic or global pandemic, however, health concerns make traditional live musical performances nearly impossible. For example, to prevent airborne pathogens from being transmitted, individual audience members and musicians must maintain social distance from all other audience members and musicians within the concert hall. Given the layout of most concert halls, it is logistically nearly impossible for musicians and audience members to be located within the same indoor concert hall and replicate the same levels of interaction and engagement while being socially distanced.

Traditional broadcast systems can be used to broadcast a live performance from a concert hall to remote audience members. The musicians at such a live performance, however, would need to be socially distanced from each other. Such traditional broadcast systems, however, do not provide audience member feedback to the musicians and do not result in the same levels of interaction and engagement that were enjoyed by musicians and audience members during traditional live musical performances.

SUMMARY

This section provides a general summary of the disclosure, and is not a comprehensive disclosure of its full scope or all of its features.

The present disclosure provides a method that includes arranging a plurality of performers at a plurality of performers locations on a performance area of a concert space such that the performers are separated by at least a predetermined distance, the predetermined distance being selected to prevent transmission of airborne pathogens between the plurality of performers while the plurality of performers are performing at the concert space. The method further includes receiving, with a virtual reality (VR) system controller, facial expression data from a plurality of facial expression sensors and body movement data from a plurality of body movement sensors, each facial expression sensor and each body movement sensor being associated with a performer of the plurality of performers, with the facial expression data from each facial expression sensor capturing facial expressions of the associated performer and the body movement data from each body movement sensor capturing body movements of the associated performer. The method further includes receiving, with the VR system controller, audio data from at least one microphone located in the concert space. The method further includes retrieving, with the VR system controller, a plurality of previously stored three-dimensional (3D) VR avatars associated with the plurality of performers and a previously stored VR performance area corresponding to and representing the performance area of the concert space from a data storage. The method further includes generating, with the VR system controller, a 3D VR performance environment showing the plurality of 3D VR avatars performing within the VR performance area and with each 3D VR avatar being manipulated to include the facial expressions and the body movements of the associated performer based on the facial expression data from the associated facial expression sensor for the associated performer and the body movement data from the associated body movement sensor for the associated performer. The method further includes generating, with the VR system controller, a live VR broadcast of the 3D VR performance environment including the plurality of 3D VR avatars displayed on the VR performance area and including the audio data such that the facial expressions and the body movements of the plurality of 3D VR avatars are synchronized with the audio data, the 3D VR avatars being displayed within the VR performance area at relative locations that appear separated by less than the predetermined distance. The method further includes transmitting, with the VR system controller, the live VR broadcast to a plurality of VR audience devices, each VR audience device outputting the live VR broadcast to an associated audience member and including at least one of an audience camera and an audience microphone that captures audience feedback data of the associated audience member. The method further includes receiving, with the VR system controller, the audience feedback data from the plurality of VR audience devices, including at least one of audience audio data and audience video data. The method further includes outputting, with the VR system controller, the audience feedback data, including at least one of the audience audio data and the audience video data, in real time to the plurality of performers while the plurality of performers are performing at the concert space.

In other features, the plurality of VR audience devices includes at least one VR headset having a stereoscopic head-mounted display and at least one tracking sensor that generates at least one of head motion data and eye motion data. The VR headset is configured to display the live VR broadcast to the associated audience member from a viewpoint determined based on at least one of the head motion data and the eye motion data.

In other features, the plurality of VR audience devices includes a computing device with a two-dimensional display. The computing device includes at least one of a tablet, a smartphone, a laptop, and a desktop computer. The computing device is configured to display the live VR broadcast on the two-dimensional display to the associated audience member from a viewpoint determined based on user input received by the computing device.

In other features, the plurality of VR audience devices are configured to enable the associated audience member to manipulate the live VR broadcast and zoom in on a selected performer of the plurality of performers, and to display a closer 3D representation of the 3D VR avatar associated with the selected performer.

In other features, the at least one microphone includes a plurality of microphones located at a plurality of difference audience member locations in an audience area of the concert space and the audio data includes a plurality of audio streams generated by the plurality of microphones. The method can further include generating, with the VR system controller, the live VR broadcast for a particular VR audience device of the plurality of VR audience devices with audio data corresponding to a particular audio stream of the plurality of audio streams.

In other features, the method can also include receiving, with the VR system controller, user input from the particular VR audience device indicating a different location and generating the live VR broadcast for the particular VR audience device with audio data corresponding to a different audio stream of the plurality of audio streams in response to receiving the user input indicating the change of location, the different audio stream being associated with a microphone at the different location.

In other features, the VR performance area includes a VR microphone stand and at least two of the 3D VR avatars are displayed within the VR performance area together singing into the VR microphone stand during at least a portion of the live VR broadcast.

In other features, the VR performance area includes a designated location and at least two of the 3D VR avatars are displayed within the VR performance area together located at the designated location of the VR performance area during at least a portion of the live VR broadcast.

In other features, outputting, with the VR system controller, the audience feedback data in real time to the plurality of performers includes outputting the audience feedback data to a plurality of augmented reality (AR) glasses worn by the plurality of performers.

In other features, the plurality of body movement sensors are accelerometers, each accelerometer being attached to the associated performer.

In other features, the plurality of body movement sensors are LIDAR sensors, each LIDAR sensor being directed to the associated performer.

In other features, the plurality of body movement sensors are video cameras, each tracking a plurality of passive optical system markers located on the associated performer.

In other features, the performance area of the concert space includes at least two tiers with at least one performer of the plurality of performers located on each of the at least two tiers, the at least two tiers are not shown in the VR performance area, and the plurality of 3D VR avatars are displayed on a single level of the VR performance area.

In other features, a floor of an upper tier of the at least two tiers is porous and the performance area of the concert space includes air handling equipment and at least one air duct that directs air flow from the air handling equipment through the floor of the upper tier and around the at least one performer located on the upper tier.

In other features, the method further includes noise filtering, with the VR system controller, the audio data to remove noise generated by the air handling equipment from the audio data.

In other features, the method further includes receiving, with the VR system controller, at least one of conductor audio data and conductor video data from a conductor device that includes at least one of a conductor body movement sensor that captures body movement instructions of a conductor of the plurality of performers and a conductor microphone that captures voice instructions of the conductor. The method also includes outputting, with the VR system controller, the at least one of the conductor audio data and the conductor video data in real time to the plurality of performers while the plurality of performers are performing at the concert space.

The present disclosure also provides a method that includes arranging a plurality of performers at a plurality of performers locations on a performance area of a concert space such that the performers are separated by at least a predetermined distance, the predetermined distance being selected to prevent transmission of airborne pathogens between the plurality of performers while the plurality of performers are performing at the concert space. The method also includes receiving, with a virtual reality (VR) system controller, facial expression data from a plurality of facial expression sensors and body movement data from a plurality of body movement sensors, each facial expression sensor and each body movement sensor being associated with a performer of the plurality of performers, with the facial expression data from each facial expression sensor capturing facial expressions of the associated performer and the body movement data from each body movement sensor capturing body movements of the associated performer. The method also includes receiving, with the VR system controller, audio data from at least one microphone located in the concert space. The method also includes retrieving, with the VR system controller, a plurality of previously stored three-dimensional (3D) VR avatars associated with the plurality of performers from a data storage. The method also includes generating, with the VR system controller, a 3D VR performance environment showing the plurality of 3D VR avatars performing with each 3D VR avatar being manipulated to include the facial expressions and the body movements of the associated performer based on the facial expression data from the associated facial expression sensor for the associated performer and the body movement data from the associated body movement sensor for the associated performer. The method also includes generating, with the VR system controller, a live VR broadcast of the 3D VR performance environment including the plurality of 3D VR avatars and including the audio data such that the facial expressions and the body movements of the plurality of 3D VR avatars are synchronized with the audio data, the 3D VR avatars being displayed at relative locations that appear separated by less than the predetermined distance. The method also includes transmitting, with the VR system controller, the live VR broadcast to a plurality of audience devices. Each audience device of the plurality of audience devices includes an audience device environment camera, a display, and at least one speaker, each audience device being configured to (i) generate image data representing an environment of the audience device with the audience device environment camera; (ii) generate live augmented reality (AR) image data that overlays the plurality of 3D VR avatars onto the image data representing the environment of the audience device; (iii) output the live AR image data on the display such that the plurality of 3D VR avatars appear to be performing within the environment of the audience device; and (iv) output the audio data of the live VR broadcast with the at least one speaker.

In other features, each audience device is further configured to output the live AR image data on the display such that the plurality of 3D VR avatars appear stationary within the environment of the audience device while the audience device is moved around the environment of the audience device.

In other features, each audience device is further configured to receive user input to select a particular 3D VR avatar and to output the live AR image data on the display such that only the particular 3D VR avatar is displayed within the environment of the audience device and the particular 3D VR avatar appears larger within the environment.

In other features, each audience device is further configured to receive user input selecting and rotating a particular 3D VR avatar and to output the live AR image data on the display such that the particular 3D VR avatar is rotated within the environment of the audience device based on the received user input.

In other features, each audience device includes an audience camera and an audience microphone that captures audience feedback data of the associated audience member. The method can further include receiving, with the VR system controller, the audience feedback data from the plurality of audience devices, including audience audio data and audience video data, and outputting, with the VR system controller, the audience feedback data, including the audience audio data and the audience video data, in real time to the plurality of performers while the plurality of performers are performing at the concert space.

In other features, the plurality of body movement sensors are accelerometers, each accelerometer being attached to the associated performer.

In other features, the plurality of body movement sensors are LIDAR sensors, each LIDAR sensor being directed to the associated performer.

In other features, the plurality of body movement sensors are video cameras, each tracking a plurality of passive optical system markers located on the associated performer.

In other features, the plurality of facial expression cameras are video cameras.

The present disclosure also provides a method that includes arranging a plurality of performers at a plurality of performers locations on a performance area of a concert space such that the performers are separated by at least a predetermined distance, the predetermined distance being selected to prevent transmission of airborne pathogens between the plurality of performers while the plurality of performers are performing at the concert space. The method further includes receiving, with a virtual reality (VR) system controller, facial expression data from a plurality of facial expression sensors and body movement data from a plurality of body movement sensors, each facial expression sensor and each body movement sensor being associated with a performer of the plurality of performers, with the facial expression data from each facial expression sensor capturing facial expressions of the associated performer and the body movement data from each body movement sensor capturing body movements of the associated performer. The method further includes receiving, with the VR system controller, audio data from at least one microphone located in the concert space. The method further includes retrieving, with the VR system controller, a plurality of previously stored three-dimensional (3D) VR avatars associated with the plurality of performers from a data storage. The method further includes generating, with the VR system controller, a 3D VR performance environment showing the plurality of 3D VR avatars associated with the plurality of performers with each 3D VR avatar being manipulated to include the facial expressions and the body movements of the associated performer, based on the facial expression data from the associated facial expression sensor for the associated performer and the body movement data from the associated body movement sensor for the associated performer. The method further includes generating, with the VR system controller, a live VR broadcast of the 3D VR performance environment including the plurality of 3D VR avatars and including the audio data such that the facial expressions and the body movements of the plurality of 3D VR avatars are synchronized with the audio data, the 3D VR avatars being displayed at relative locations that appear separated by less than the predetermined distance. The method further includes transmitting, with the VR system controller, the live VR broadcast to a plurality of audience devices. Each audience device of the plurality of audience devices is configured to generate and display live holographic data such that the plurality of 3D VR avatars appear to be performing as holographs within an environment of the audience device.

In other features, each audience device includes a holographic screen and the live holographic data is displayed via the holographic screen.

In other features, each audience device includes a volumetric display and the live holographic data is displayed via the volumetric display.

In other features, the plurality of body movement sensors are accelerometers, each accelerometer being attached to the associated performer.

In other features, the plurality of body movement sensors are LIDAR sensors, each LIDAR sensor being directed to the associated performer.

In other features, the plurality of body movement sensors are video cameras, each tracking a plurality of passive optical system markers located on the associated performer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
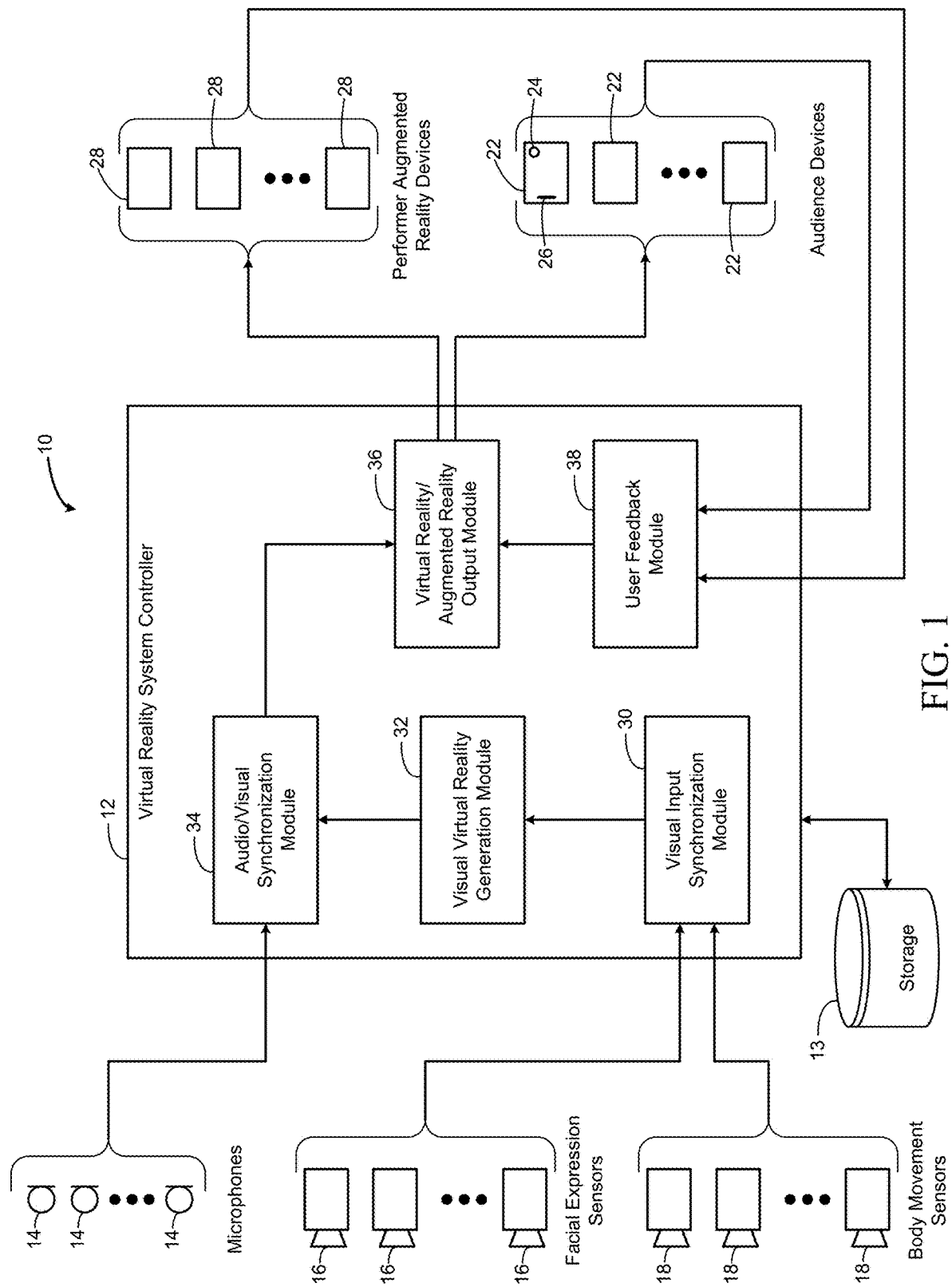
FIG. 1 is a functional block diagram of an interactive virtual reality broadcast system according to the present disclosure.

Example embodiments will now be described more fully with reference to the accompanying drawings.

The present disclosure provides interactive virtual reality broadcast systems and methods that include arranging performers at socially distanced performer locations on a performance area, such as a stage of a concert space. In other words, the performers are located on the stage at locations that are separated by a predetermined distance, such as six feet, selected to prevent the transmission of airborne pathogens between the performers while performing on stage. As discussed in detail below, each of the performers has an associated facial expression sensor, such as a camera, directed towards a face of the performer to capture the facial expressions of the performer while the performer is performing. For example, the performer may be a musician and the facial expression sensor may capture the facial expressions of the musician while the musician is playing music. Each of the performers also has an associated body movement camera that captures the body movements of the performer. Microphones are placed in the concert space, such as in an audience area of the concert space, in the performance area, or on or near instruments being played by the performers, and capture audio data generated by the performers, such as the music being played by the musicians.

A virtual reality system controller receives video data from the performer cameras and the body movement cameras and audio data from the microphones and generates a three-dimensional virtual reality avatar for each of the performers performing on the stage. For example, the avatars are generated and manipulated to exhibit body movements and facial expressions that correspond to the performer associated with the avatar. The virtual reality system controller then synchronizes the audio data and the video data such that the facial expressions and body movements of the avatars are synchronized with the audio data. The virtual reality system controller then generates a live virtual broadcast of a virtual reality performance that displays the avatars performing on a virtual reality performance area and outputs audio data synchronized with the movements of the avatars such that the avatars are shown playing the music of the audio data. While the live performers are socially distanced on the actual stage where they are performing, the virtual reality avatars can be shown close together, and not socially distanced, at locations in the virtual performance area corresponding to where the performers would normally be located during a traditional live performance.

As discussed in further detail below, the live virtual reality broadcast can be transmitted to virtual reality audience devices, such as virtual reality headsets or other audience devices, such as tablets, mobile devices, or other computing devices. The virtual reality audience devices can include video cameras and microphones to transmit audience feedback in the form of video data of the associated audience member's face and audio data, such as cheering, whistling, etc., generated by the associated audience member. The audience feedback data can be transmitted back to the virtual reality system controller, which can then output the audience feedback data to augmented reality devices, such as augmented reality glasses, being worn by and/or associated with the performers so that the performers can receive audience feedback in real time during the performance.

In this way, the interactive virtual reality broadcast systems and methods of the present disclosure allow performers to be socially distanced on stage, while generating and transmitting a virtual reality environment, including avatars of the performers synced with the music being played by the performers, to audience members using virtual reality devices. In addition, the interactive virtual reality broadcast systems and methods of the present disclosure receive and transmit audience member feedback, such as audience member video and audio data, to augmented reality devices of the performers so the performers can receive live audience feedback during their performance. In this way, the interactive virtual reality broadcast systems and methods of the present disclosure are able to generate similar levels of interaction and engagement that would previously have been enjoyed by musicians and audience members during traditional live musical performances, while maintaining social distance between all participants to prevent the transmission of airborne pathogens. Additional details and features are discussed below with reference to the figures.

With reference to FIG. 1, an interactive virtual reality (VR) broadcast system 10 is shown and includes a VR system controller 12 and a data storage 13. The VR system controller 12 receives input from one or more microphones 14, one or more facial expression sensors 16, and one or more body movement sensors 18. The VR system controller 12 generates output to one or more audience devices 22 that may include, for example, a camera 24 and/or a microphone 26. The VR system controller 12 also generates output to one or more performer augmented reality (AR) devices 28. As discussed in further detail below, the data storage 13 stores data including, for example, a previously generated three-dimensional (3D) VR model representing an associated concert hall space and 3D. The 3D VR model of the associated concert hall space can include image data and corresponding coordinate data so that the entire concert hall space can be replicated in the 3D VR environment, as discussed in further detail below. The data storage 13 also stores data representing previously generated 3D VR avatars for each of the performers within the concert hall space. As discussed in further detail below, 3D VR avatars corresponding to each of the performers can be generated to look like the actual performers, including similar body types, similar face shapes, similar eye color, similar hair color, similar hair style, etc. The data storage 13 also stores a library of 3D VR instruments that includes different types and styles of instruments that can be played by the 3D VR avatars in the 3D VR environment. The VR system controller 12 can retrieve the data for the 3D VR model of the concert hall, the data for the 3D VR avatars, and the data for the particular 3D VR instruments to be played by the 3D VR avatars, from the data storage 13, place the 3D VR avatars with the 3D VR instruments in the 3D VR model of the concert hall to generate a 3D VR environment. The VR system controller 12 can then manipulate the 3D VR avatars based on facial expression data received from the facial expression sensors 16 and body movement data from the body movement sensors 18, and synchronize the body movements and facial expressions of the 3D VR avatars with the audio data from the microphones 14 to generate and output a 3D VR audio/visual representation of the performers performing and playing their instruments within the concert hall space.

The VR system controller 12 includes a visual input synchronization module 30, a visual virtual reality generation module 32, an audio/visual synchronization module 34, a VR/AR output module 36, and a user feedback module 38. The visual input synchronization module 30 receives input from the facial expression sensors 16 and the body movement sensors 18.

Figure 2:
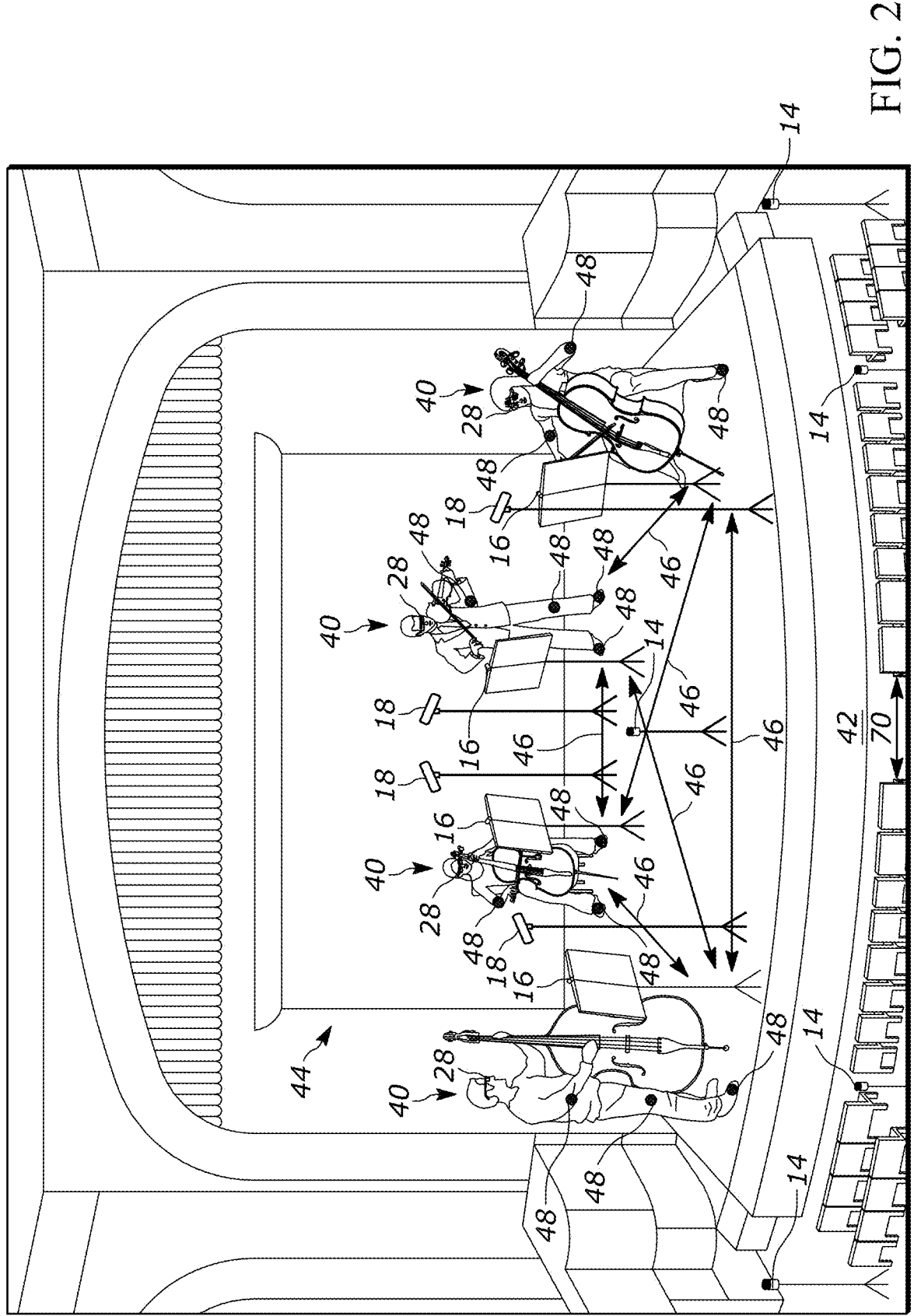
FIG. 2 is an illustration of performers located on a performance area of a concert space according to the present disclosure.
Figure 3:
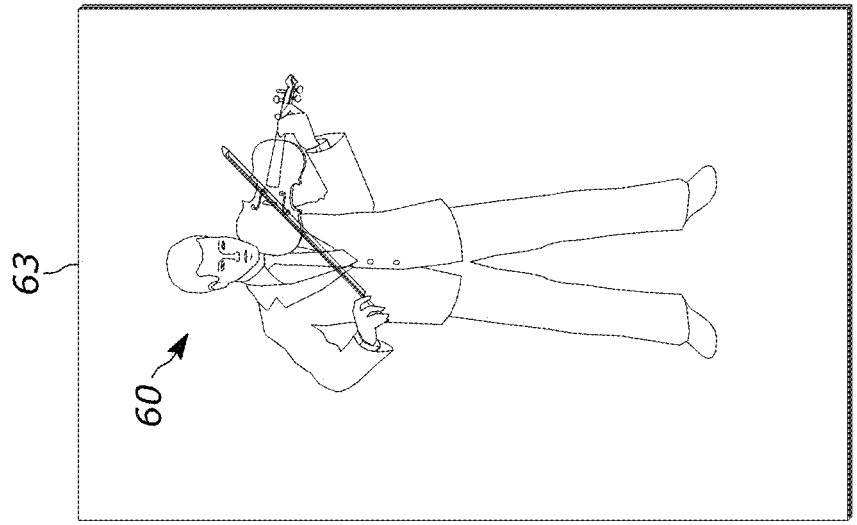
FIG. 3 is an illustration of a live performer with equipment and a three-dimensional avatar of the performer according to the present disclosure.
Figure 3:
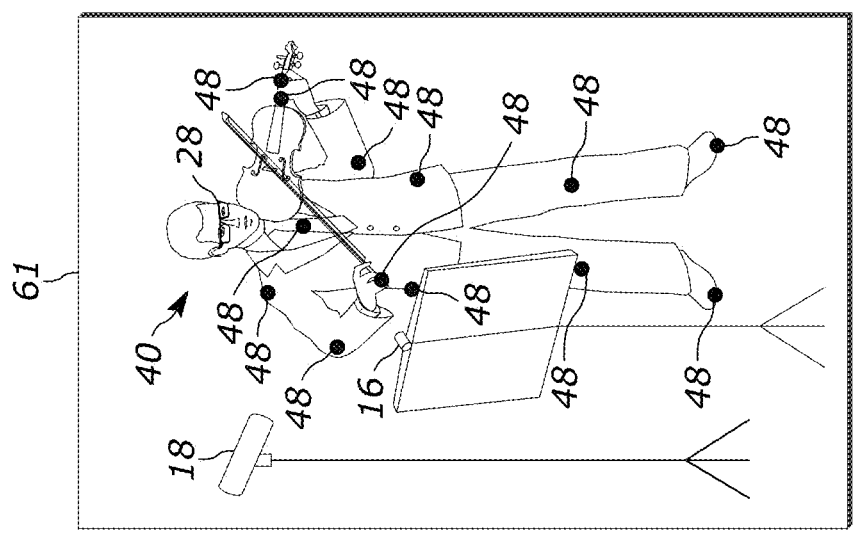

With additional reference to FIG. 2 and FIG. 3, the facial expression sensors 16 can each include a video camera pointed at a face of a performer 40. The facial expression sensors 16, for example, can generate facial expression data that captures facial expressions of the associated performer 40. As shown in FIG. 2, the performers 40 are arranged at performer locations on a performance area 42, such as a stage, of a concert space 44, such as a concert hall. While FIG. 2 shows four performers 40 playing different instruments as an example, any number of performers 40 playing any number of instruments can be used. As shown in FIG. 2, the performers 40 are located at locations separated by a distance 46 that is larger than a predetermined distance. For example, the predetermined distance can be selected to be sufficiently large to prevent the transmission of airborne pathogens, such as viruses, between the performers 40 while the performers 40 are performing at the concert space 44.

The body movement sensors 18 can be video cameras that perform motion capture by tracking the locations of passive optical system markers 48 place at various locations on the performers 40. For example, the passive optical system markers 48 can be placed on the fingers, chest, shoulders, elbows, hips, knees, toes, etc., of the performer 40, as shown in FIG. 3. The video camera of the body movement sensors 18 can then generate body movement data that captures body movements of the associated performer 40 based on the motion capture of the passive optical system markers 48 and transmit the body movement data to the VR system controller 12.

Additionally or alternatively, the body movement sensors 18 can be accelerometers. In such case, the passive optical system markers 48 are replaced with individual accelerometers that generate body movement data that captures body movements of the performer 40 as the performer 40 moves and that communicate the body movement data to the VR system controller 12. For example, the accelerometers can be located at the fingers, chest, shoulders, elbows, hips, knees, toes, etc., of the performer 40. Additionally or alternatively, the body movement sensors 18 can be LIDAR sensors. In such case, the LIDAR sensors can be pointed at the performer 40 to generate body movement data that captures body movements of the associated performer 40 based on the movement of the performer 40 and to communicate the body movement data to the VR system controller 12. In the event LIDAR sensors are used as the body movement sensors 18, the passive optical system markers 48 can be omitted. Additionally or alternatively, any combination of video cameras with passive optical system markers, accelerometers, and/or LIDAR sensors can be used together. For example, video cameras and passive optical system markers can be used for motion capture for visible portions of the performers body that can be easily tracked with motion capture. In addition, accelerometers and/or LIDAR sensors can be used to capture other areas of the performers body, such as individual fingers. In this way, any combination of video cameras with passive optical system markers, accelerometers, and/or LIDAR sensors can be used to body movements of the associated performer 40 and generate body movement data indicating the captured body movements of the associated performer 40.

The facial expression data from the facial expression sensors 16 and the body movement data from the body movement sensors 18 is received by the visual input synchronization module 30 of the VR system controller 12. The visual input synchronization module 30 synchronizes the facial expression data and the body movement data to generate synchronized visual data. For example, the visual input synchronization module 30 can use time markers associated with, or embedded within, the facial expression data and the body movement data to synchronize both sets of data together and generate the synchronized visual data.

The visual input synchronization module 30 outputs the synchronized visual data to the visual VR generation module 32. The VR generation module receives the synchronized visual data, retrieves the previously stored 3D VR avatars corresponding to each of the performers 40 and the previously stored 3D VR instruments from the data storage 13, and manipulates the 3D VR avatars 60 in the 3D VR environment, based on the facial expression data and the body movement data, so that the body movements and facial expressions of the 3D VR avatars 60 to correspond to the actual body movements and facial expressions of each of the performers 40 performing in the real-world concert space. In other words, the previously stored 3D VR avatars 60 are manipulated to include the facial expressions and body movements of the associated performers 40 based on the facial expression data and the body movement data of the synchronized visual data.

As mentioned above, the data storage 13 stores a library of 3D VR instruments, each having corresponding image data and 3D coordinate data representing the instrument. The library of 3D VR instruments can include any number of standard instruments corresponding to a standard shape, size, and color of the instrument, such as a standard violin, a standard cello, etc. The library of 3D VR instruments can also include a specialized instrument having a non-standard shape, size or color of the instrument. In the event a particular performer is generally known for playing a specialized instrument, a 3D VR representation of that performer's specialized instrument can be stored in the library of 3D VR instruments. As an example, violinist Laurie Anderson plays an electric violin that has a distinctive non-traditional body shape and the tuning pegs located on the body of the instrument instead of at the end of the neck of the violin. In this example, if Laurie Anderson were playing at a concert hall, the 3D VR avatar 60 corresponding to Laurie Anderson could be shown playing a 3D VR non-traditionally shaped violin that looks like the non-traditional violin that Laurie Anderson plays in real life. Other violinists at the performance, however, could be shown playing the standard violin from the library of 3D VR instruments. The library of 3D VR instruments can also include different styles or shapes of the same type of instrument. For example, the library of 3D VR instruments can include a number of different types of guitars, including guitars with a Stratocaster shape, guitars with a Les Paul shape, etc. In such case, a particular performer could choose which type of 3D VR guitar they would like their corresponding 3D VR avatar 60 to be playing during the performance. In addition, a performer could switch instruments in real life during the performance and a corresponding switch could be made in the VR environment.

FIG. 3 shows a real-world performer 40 on the left box 61 playing a violin and the resulting 3D VR avatar 60 representing the same performer 40 on the right box 63. As shown in FIG. 3, the 3D VR avatar 60 is generated and shown playing the same 3D VR instrument, i.e., the violin, as the associated performer 40 upon which the 3D VR avatar 60 is based. Generation of the 3D VR avatars 60 is discussed in further detail below with reference to FIG. 19.

Figure 4:
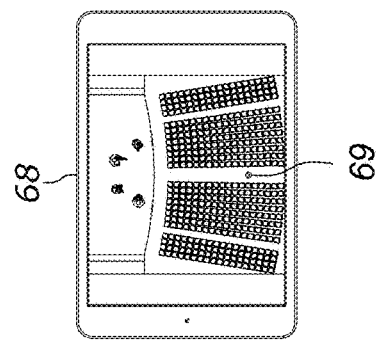
FIG. 4 is an illustration of a live virtual reality broadcast of a virtual reality performance including three-dimensional avatars performing within a virtual reality performance area according to the present disclosure.
Figure 4:
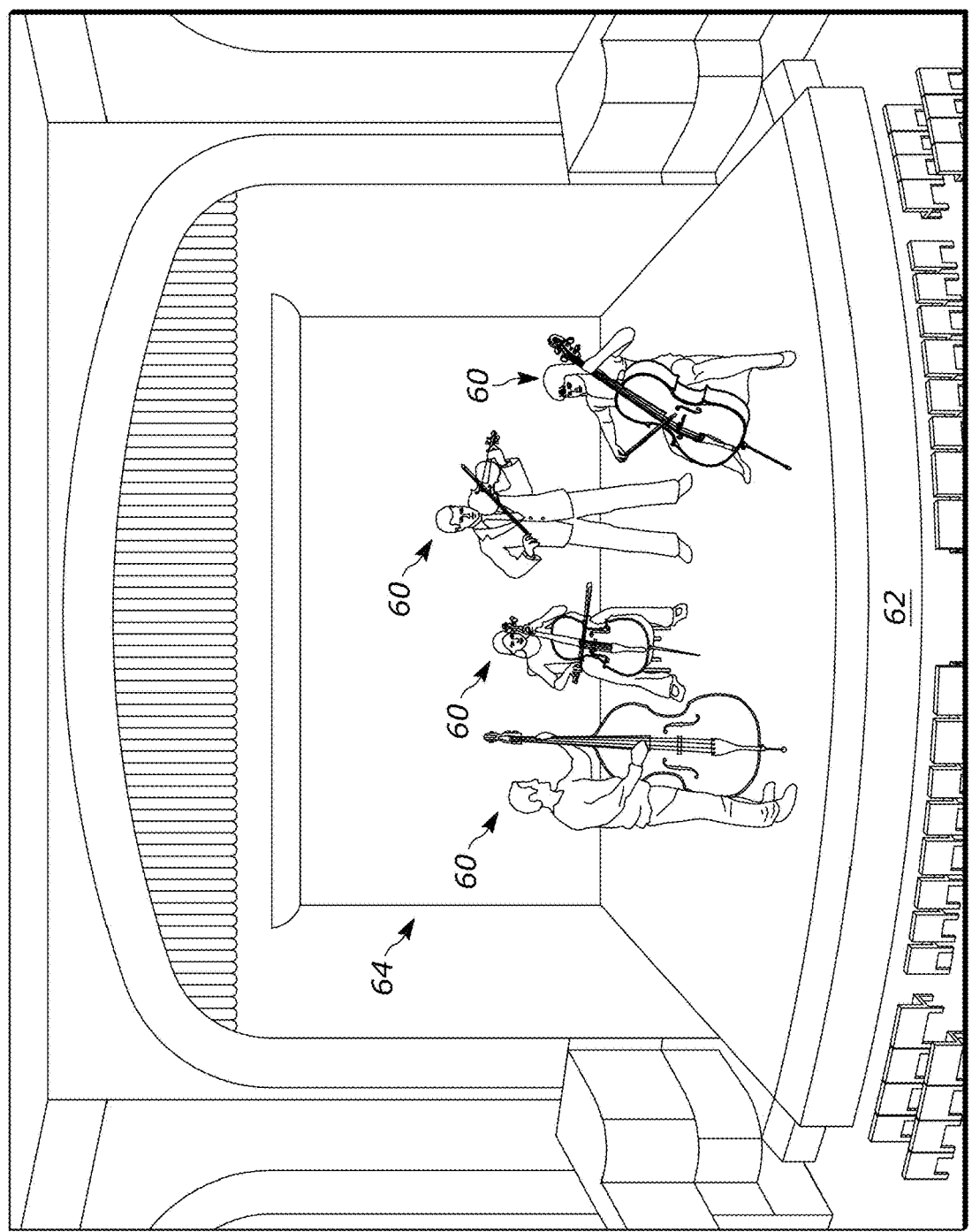

The visual VR generation module 32 generates 3D VR avatars 60 for each of the performers 40, as shown in FIG. 4. In addition, the visual VR generation module 32 retrieves the 3D VR model of the concert space 44 and generates a VR environment showing the 3D VR avatars 60 playing their 3D VR instruments in a VR performance area 62 that is a VR representation of the real-world performance area 42 and a VR concert space 64 that is a VR representation of the real-world concert space 44. In other words, the real-world performers 40 are shown in FIG. 2 performing on the real-world performance area 42 of the real-world concert space 44 while the associated 3D VR avatars 60 for each of the performers 40 are shown performing on the VR performance area 62 of the VR concert space 64 in FIG. 4. As noted above, the real-world performers 40 are each separated from each other by a distance 46 that is larger than a predetermined distance selected to be sufficiently large to prevent the transmission of airborne pathogens, such as viruses. In the VR concert space 64, however, the 3D VR avatars 60 are generated to appear on the VR performance area 62 at relative locations that appear in the VR environment to be separated by less than the predetermined distance. In other words, the 3D VR avatars 60 are generated to appear at locations the performers would normally be located at during a traditional live performance without social distancing and without the health concerns associated with an epidemic or global pandemic.

The entire VR environment, including the 3D VR avatars 60, the VR performance area 62, and the VR concert space 64, is generated by the visual VR generation module 32 of the VR system controller 12 and outputted to the audio/visual synchronization module 34 of the VR system controller 12. FIG. 4 also includes an overhead view 68 of the VR concert space 64 showing a viewpoint position 69 of the viewer. As shown in FIG. 4, the viewpoint is located at a location in the center of the VR concert space 64 in a left-to-right direction, a number of rows back from the VR performance area 62. While FIG. 4 shows the overhead view 68 presented on a tablet device as an example to show the overhead view 68, the audience member can use any type of audience device 22 to select the location for the audience member's viewpoint of the performance within the 3D VR environment.

The audio/visual synchronization module 34 receives the entire VR environment, including the 3D VR avatars 60, the VR performance area 62, and the VR concert space 64, as well as the audio data from the one or more microphones 14. As shown in FIG. 2, the one or more microphones 14 can be located at various locations within an audience area 70 throughout the concert space 44. In FIG. 2, for example, four microphones 14 are shown at different locations in the audience area 70 located near the front of the performance area 42. A microphone 14 is also shown on the actual performance area 42 between the performers 40. Additional microphones 14 can be provided at locations throughout the concert space 44. Additional microphones 14 could also be located on the actual performance area 42 near individual performers 40. Additional microphones 14 could also be placed near the back of the concert space 44, in any balconies of the concert space 44, etc. Alternatively, microphones 14 could be placed in each seat or in alternating seats, such as every other seat or row, of the audience area 70. As discussed in further detail, the audience devices 22 can be configured to generate audio output that corresponds to a microphone location that is associated with a closest position to where the audience member's viewpoint is located within the VR environment. For example, if an audience member is viewing the VR performance from a location that is to the front right of the VR concert space 64, then the associated audio output for the audience device of that particular audience member can be configured to correspond to the audio data generated by a microphone that is nearest to that location with the real-world concert space 44.

The audio/visual synchronization module 34 synchronizes the audio data from the one or more microphones 14 with the entire VR environment, including the 3D VR avatars 60, the VR performance area 62, and the VR concert space 64 generated by the visual VR generation module 32, such that the facial expressions and body movements of the 3D VR avatars 60 are synchronized with the audio data. For example, the audio/visual synchronization module 34 can use time markers associated with, or embedded within, the facial expression data, the body movement data, and the audio data to synchronize the audio data with the facial expression and body movement data. The audio/visual synchronization module 34 outputs the synchronized audio/visual VR environment data to the VR/AR output module 36.

The VR/AR output module 36 of the VR system controller 12 outputs the synchronized audio/visual VR environment data, including the synchronized facial expression data, body movement data, and audio data, to one or more audience devices 22.

Figure 5:
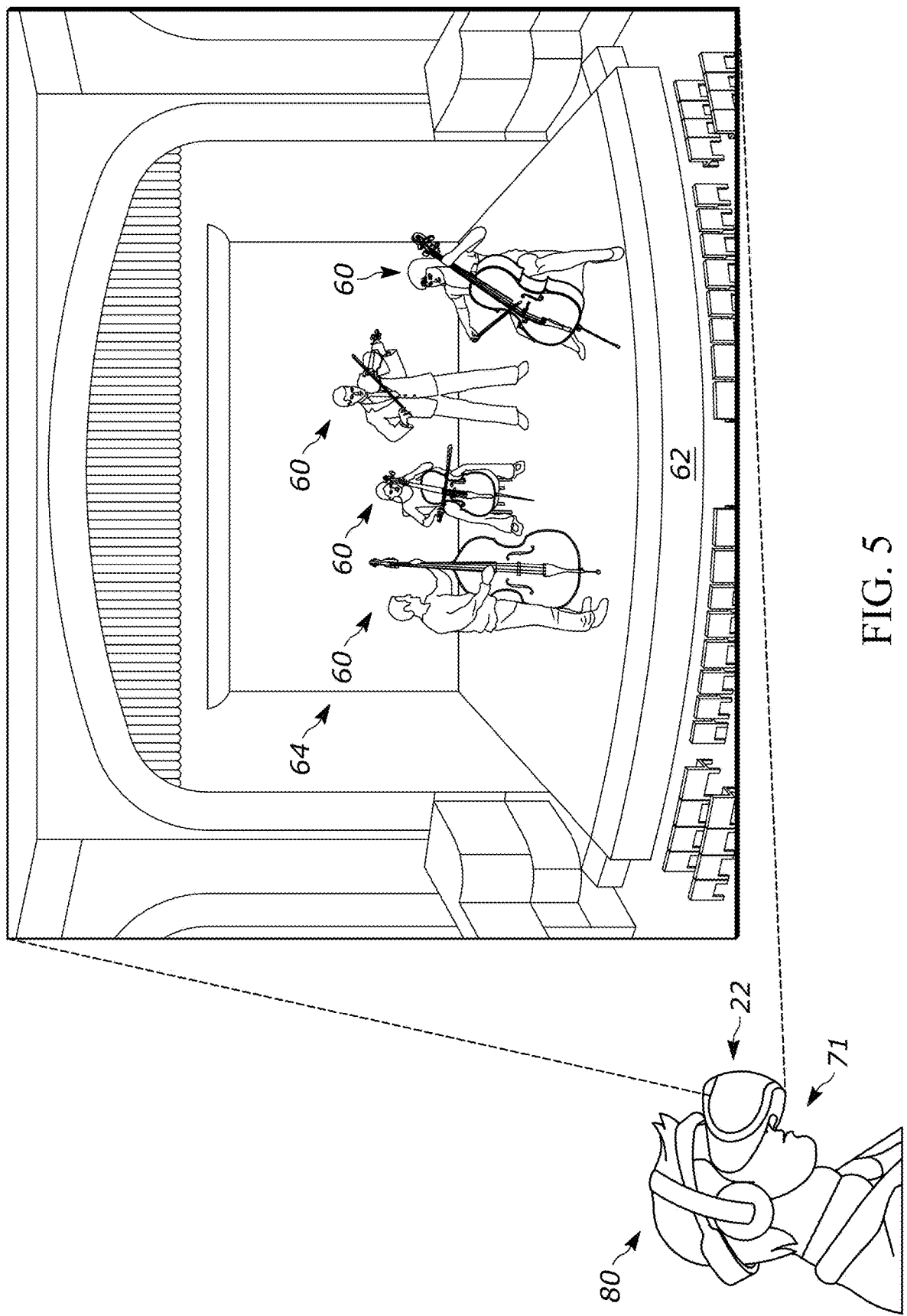
FIG. 5 is an illustration of an audience member viewing a live virtual reality broadcast using a virtual reality headset according to the present disclosure.

With reference to FIG. 5, the audience device 22 can include a VR headset worn and used by an audience member 80. The VR headset 71 can include a stereoscopic head-mounted display, headphone speakers to output audio data, at least one head motion tracking sensor that generates head motion data, and at least one eye tracking sensor that generates eye motion data. As shown in FIG. 5, the entire VR environment, including the 3D VR avatars 60, the VR performance area 62, and the VR concert space 64 are displayed to the audience member 80 via the stereoscopic head-mounted display and the synchronized audio data is outputted to the audience member via the headphone speakers. The at least one head motion tracking sensor and the at least one eye tracking sensor generate head motion data and eye motion data that indicates the directional viewpoint of the audience member's eyes so that the audience member 80 can look around the VR concert space 64 by moving the VR headset 71 up and down and rotating VR headset 71 left and right.

The viewpoint of the audience member 80 within the VR environment can be set based on a predetermined position within the VR concert space 64. For example, the audience member 80 can purchase a "seat" within the VR concert space 64 and view the VR performance from that purchased seat location. In such case, the synchronized audio data outputted to the audience member could be selected to correspond to a microphone 14 within the audience area 70 of the concert space 44 that is closest to a seat location corresponding to the purchased seat location within the VR concert space 64. In addition, the audience member 80 can move from one location to another within the VR concert space. For example, audience members 80 can be allowed to freely move from location to location within the VR concert space 64. Alternatively, audience members 80 can purchase "seats" within the VR concert space 64 and pay additional money to upgrade their "seat" to a closer location within the VR concert space 64. The seat locations within the VR concert space 64 can correspond to seat locations within the actual real-world concert space 44. Additionally or alternatively, audience members 80 can be allowed to move anywhere within the VR concert space 64, including to a location on the VR performance area 62, i.e., to a location on stage next to or near a 3D VR avatar 60 on the VR performance area 62.

Figure 6:
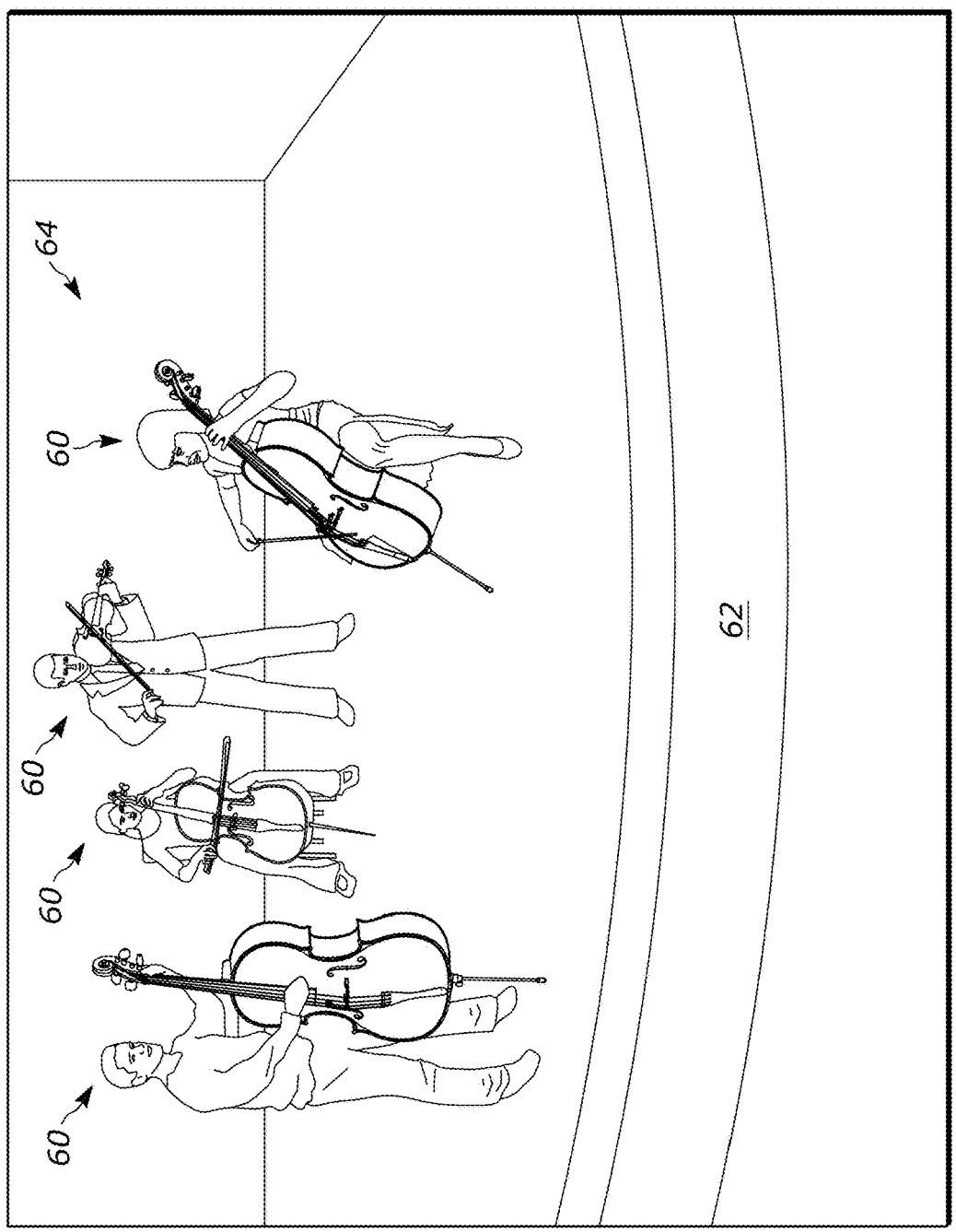
FIG. 6 is another illustration of a live virtual reality broadcast of a virtual reality performance including three-dimensional avatars performing within a virtual reality performance area according to the present disclosure.

With reference to FIG. 6, a viewpoint of the audience member 80 has moved from the viewpoint location shown in FIG. 5 to a viewpoint to the right of the stage and zoomed in, as compared with the viewpoint location shown in FIG. 4 and FIG. 5. With reference to the overhead view 68, the viewpoint position 69 of the viewer has moved to the lower right of the concert space 64 to a location in first row of the 3D VR environment. In such case, the synchronized audio data outputted to the audience member 70 can likewise be moved to correspond to a microphone 14 within the audience area 70 of the concert space 44 that is closest to a seat location corresponding to the purchased seat location within the VR concert space 64. As noted above with respect to FIG. 4, while FIG. 6 shows the overhead view 68 presented on a tablet device as an example to show the overhead view 68, the audience member can use any type of audience device 22 to select the location for the audience member's viewpoint of the performance within the 3D VR environment. As further noted above, both the visual and the audio feed outputted to the particular audience member is updated and adjusted based on selected location for the viewpoint to provide a VR experience that would correspond to the selected location to replicate the visual and audio experience the audience member would have seen and heard if the audience member were physically present within the concert space 44 at a physical location corresponding to the selected location for the viewpoint.

From any location within the VR concert space 64, the audience member 80 can utilize a binocular feature to zoom in and view a closer 3D VR representation of any focal point within the VR concert space 64. For example, an audience member 80 can use the binocular feature to zoom in on a particular 3D VR avatar 60. More specifically, an audience member 80 can use the binocular feature to zoom in on a particular portion of a particular 3D VR avatar, such as the 3D VR avatar's hands or on the 3D VR avatar's face. In this way, the audience member 80 can focus and zoom in to watch the 3D VR avatar's hands playing the associated virtual instrument. Additionally or alternatively, the audience member 80 can focus and zoom in to watch the 3D VR avatar's face and see the facial expressions. In each case, motions of the 3D VR avatar 60 correspond to those of the corresponding performer 40. In other words, the motion of the 3D VR avatar's hands corresponds to the motion of the hands of the corresponding performer 40 as captured by the associated body movement sensor 18. Similarly, the facial expressions of the 3D VR avatar's face correspond to the facial expressions of the corresponding performer 40 as captured by the associated facial expression sensor 16.

Figure 7:
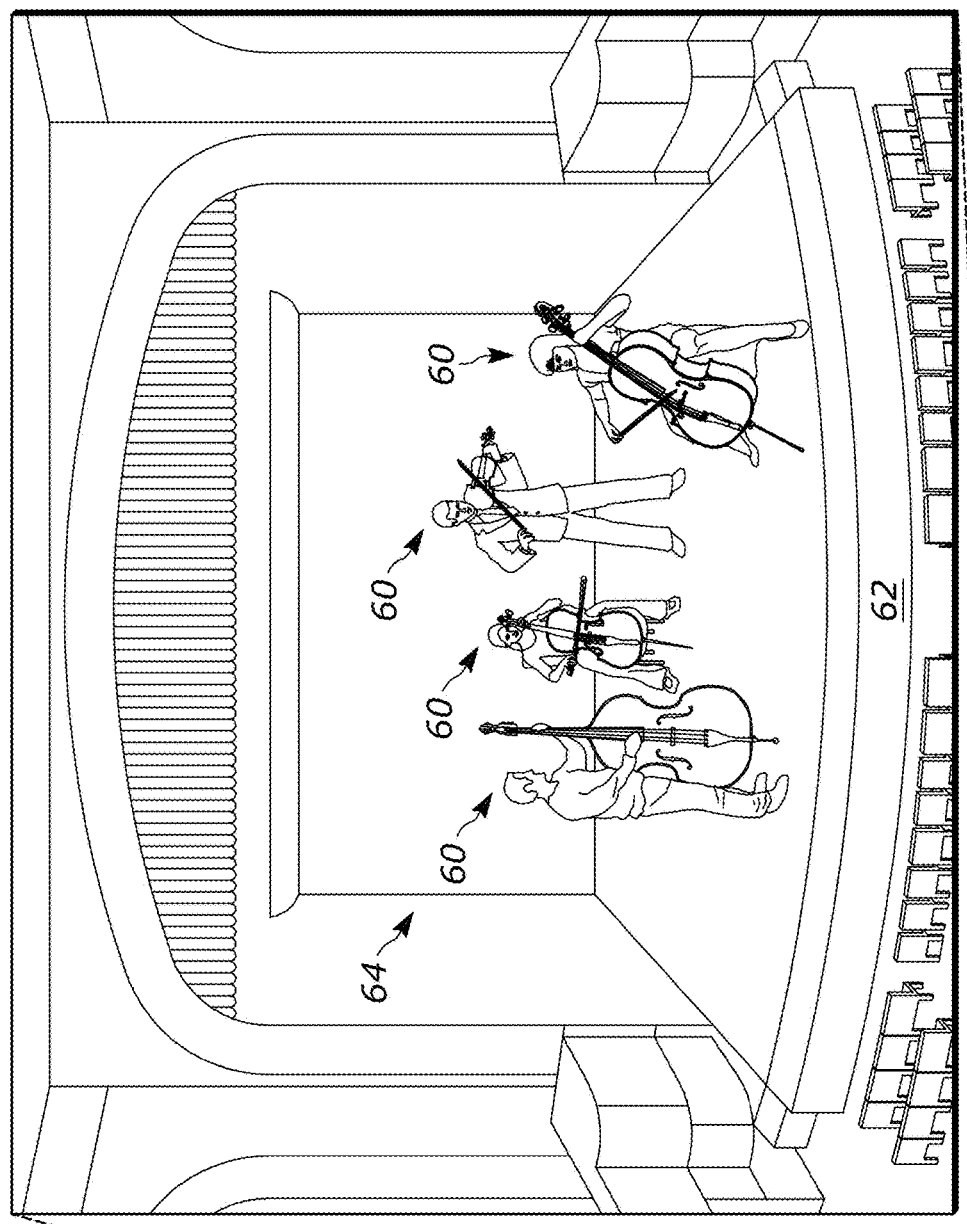
FIG. 7 is an illustration of an audience member viewing a live virtual reality broadcast using a tablet device according to the present disclosure.
Figure 7:
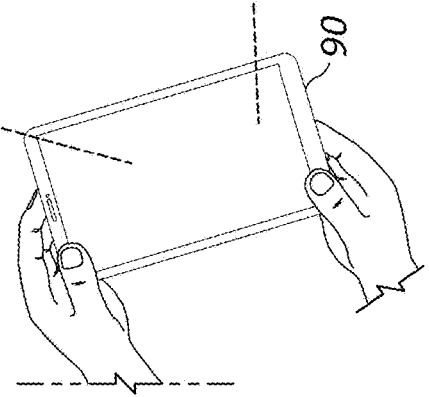

While the audience device 22 can be a VR headset 71, as shown in FIG. 5, the audience device 22 can alternatively be a computing device having a two-dimensional display, such as a tablet, a smartphone, a laptop, a desktop computer, or any other computing device with a two-dimensional display. With reference to FIG. 7, the audience device 22 can be a handheld tablet 90. In the event the audience device 22 has a two-dimensional display, the VR environment can be collapsed from a 3D environment to a flat two-dimensional (2D) environment. In such case, the VR/AR output module 36 outputs the synchronized audio/visual VR environment data to the audience device 22 and the audience device displays the VR environment data in a 2D format. Additionally or alternatively, the audience device 22 can communicate with the VR/AR output module 36 to indicate to the VR/AR output module 36 the type of display utilized by the audience device 22. In such case, in the event the audience device 22 indicates that it includes a 2D display, the VR/AR output module 36 can output the VR environment data in the 2D format. In this way, the amount of data communicated over a network to the audience device 22 can be reduced as compared with the amount of VR environment data communicated in a 3D format to the audience device 22.

The audience devices 22 can be configured with appropriate input devices to capture audience feedback data, such as audience audio data and audience video data. For example, with reference to FIG. 1, the audience devices 22 can include one or more cameras 24 and a microphone 26. The one or more cameras 24 can, for example, capture video data that includes facial expressions of the associated audience member 80. The microphone 26 can capture audio data that includes audible noises, such as hand claps, whistles, cheering, etc., generated by the associated audience member 80.

The audience feedback data from the audience devices 22 is fed back to the user feedback module 38 of the VR system controller 12. The user feedback module 38 receives and synchronizes the audience feedback data from each of the audience devices 22 and outputs the synchronized audience feedback data to the VR/AR output module 36.

The VR/AR output module 36 can output the audience feedback data to the audience devices 22 and/or performer augmented reality devices 28. For example, the VR/AR output module 36 can output the audience feedback data to the audience devices 22 so that audience members 80 can hear the audible reactions of other audience members 80 watching the live VR broadcast performance and/or look around to see the real time facial expressions of other audience members 80 watching the live VR broadcast performance.

In addition, the performers 40 can be wearing performer AR devices 28. The performer augmented reality devices 28, for example, can include AR glasses, as shown in FIG. 2 and FIG. 3. The AR glasses can be configured to display visual data to display the facial expressions of one or more audience members 80 during the live VR broadcast performance. For example, the VR/AR output module 36 can output the visual data to a display of the AR glasses such that the visual audience feedback data is displayed as an overlay visible to the performer 40. Additionally, AR glasses can include integrated speakers to output audio data. Alternatively, the augmented reality devices 28 can additionally include separate headphones. In each case, the VR/AR output module 36 can output the audio audience feedback data to the speakers of the AR glasses or to the separate headphones so that the performers 40 can hear the audible reactions of the audience members 80 watching the live VR broadcast performance. Additionally or alternatively, the VR/AR output module 36 can output the visual audience feedback data to a display physically located within the concert space. For example, the screen can be located toward the front of the performance area 42 such that the performers 40 can look up to see the facial expressions of audience members 80 displayed on the screen, while also listening to the audio data including the audible reactions of the audience members during the live VR broadcast performance. Additionally or alternatively, the audio data including the audible reactions of the audience members could be output with speakers into the performance area 42 such that the performers can hear the audio audience feedback data. In such case, the microphones 14 within the performance area 42 could receive the audio feedback data, along with the audio data of the performers 40, so that a combination of the audio audience feedback data with the audio data of the performance by the performers 40 is captured by the microphones 14 and then output by the VR/AR output module 36 to the audience devices 22. In this way, audience members 80 can hear the audible audience reactions as part of the virtual performance. Additionally or alternatively, audio and visual data from other performers 40 and/or audio and visual data from a conductor of the performers 40 and/or a producer of the live VR performance can be outputted to the performer AR devices 28.

Figure 8:
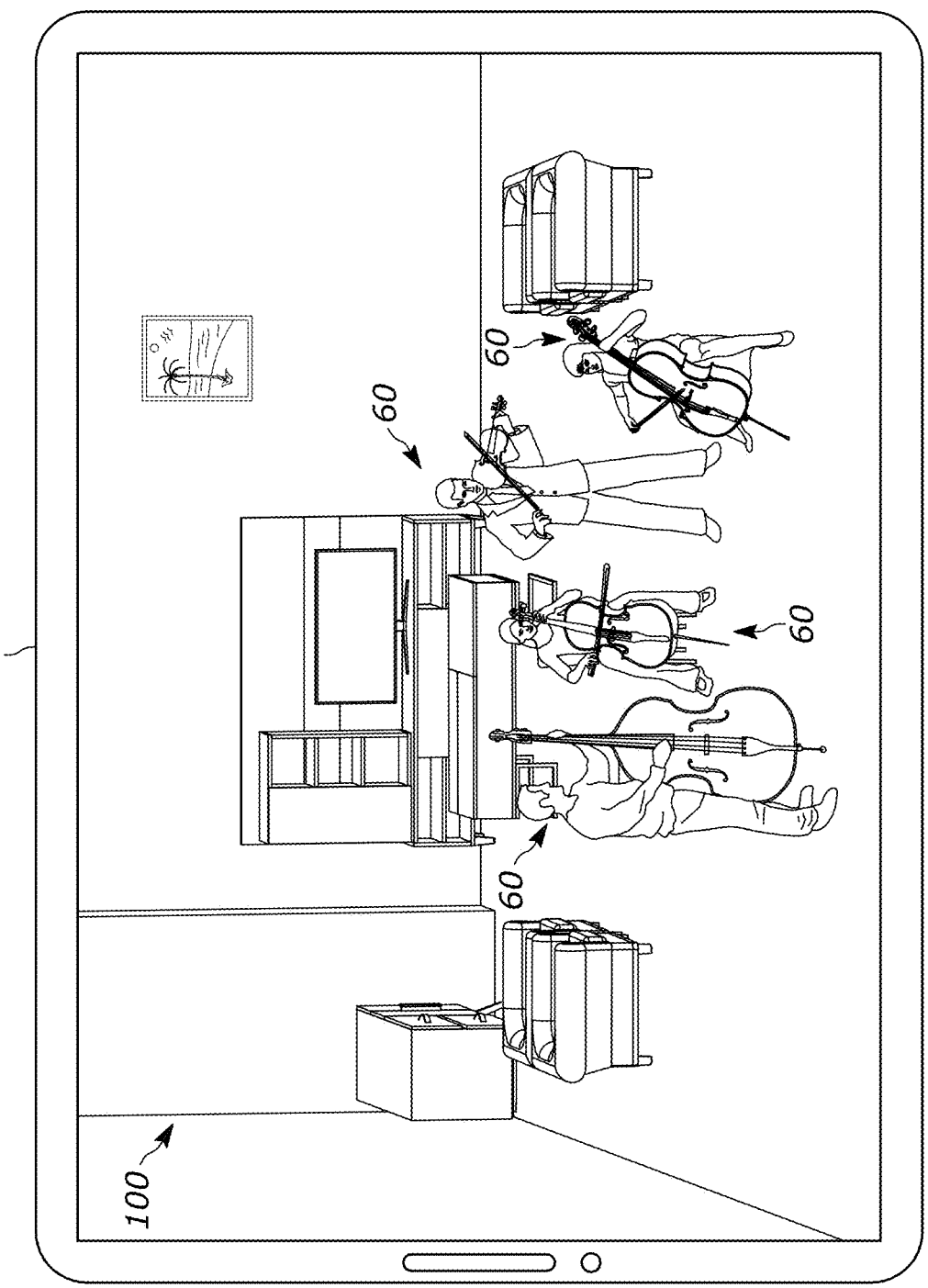
FIG. 8 is an illustration of a tablet device displaying a live augmented reality broadcast according to the present disclosure.

In other features, and in an alternative embodiment, instead of displaying the 3D VR avatars 60 of the performers 40 within the VR concert space 64, the 3D VR avatars 60 can be displayed in an AR environment by overlaying the 3D VR avatars 60 onto image data representing a real-world environment of the audience device 22. For example, as shown in FIG. 8, the audience device 22 is a tablet 90 that utilizes the camera 24 of the audience device 22 to generate image data of the environment of the audience device 22. In the example of FIG. 7, the audience device 22 generates image data of a living room at a location of the audience device. The audience device 22 can then display an AR environment 100 whereby the 3D VR avatars 60 are overlaid on the image data of the environment such that the 3D VR avatars 60 appear to be performing in the living room at the location of the audience device, as shown in FIG. 8. In this embodiment, the VR/AR output module 36 can communicate data representing the 3D VR avatars 60 along with corresponding synchronized audio data to the audience device 22. The audience device can then receive the image data of the environment of the audience device 22 from the audience device camera 24 and generate the image of the AR environment by overlaying the 3D VR avatars 60 onto the image data of the environment of the audience device 22.

Figure 9:
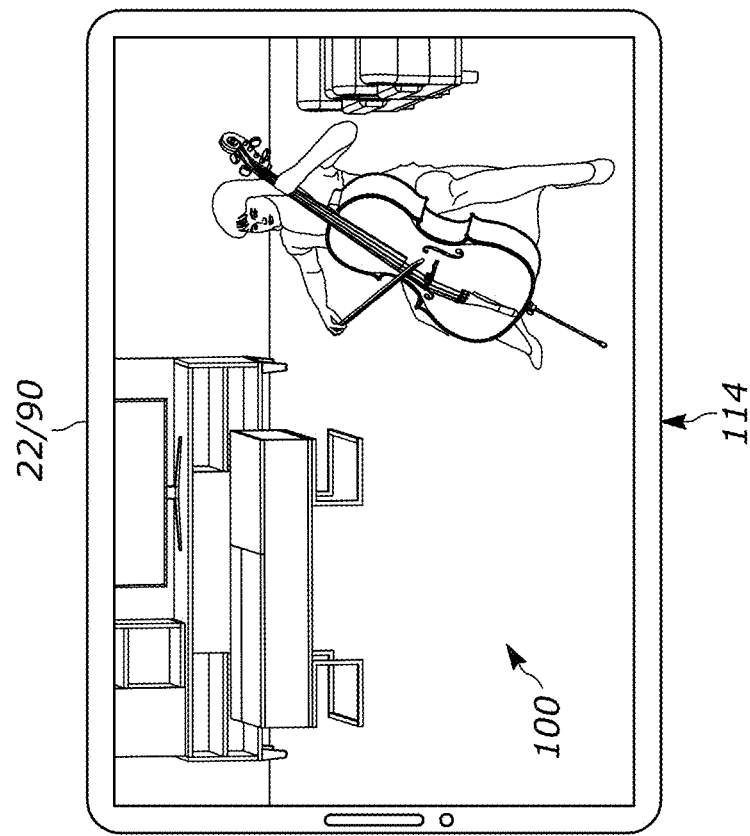
FIG. 9 is an illustration of a tablet device displaying a live augmented reality broadcast and utilizing a lasso selection and zoom feature according to the present disclosure.
Figure 9:
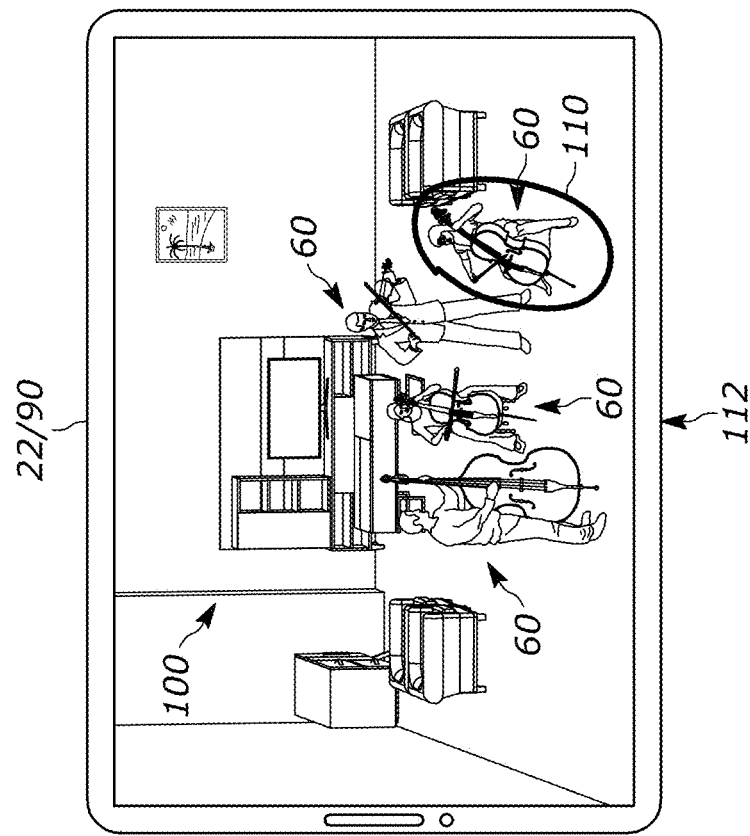

With reference to FIG. 9, the audience member 80 can utilize a lasso zoom feature to zoom in and/or enlarge a particular 3D VR avatar 60 within the AR environment 100. For example, the audience member 80 can utilize a touchscreen of the tablet 90 to draw a circular outline 110 around a particular 3D VR avatar 60, as shown on the left side 112 of FIG. 9. Once the particular 3D VR avatar 60 is selected with the lasso zoom feature by drawing the circular outline 110, the audience device 22 can reconfigure the display of the AR environment 100 such that the selected 3D VR avatar 60 is enlarged to appear larger within the AR environment as compared with the previous display, as shown on the right side 114 of FIG. 9.

Figure 10:
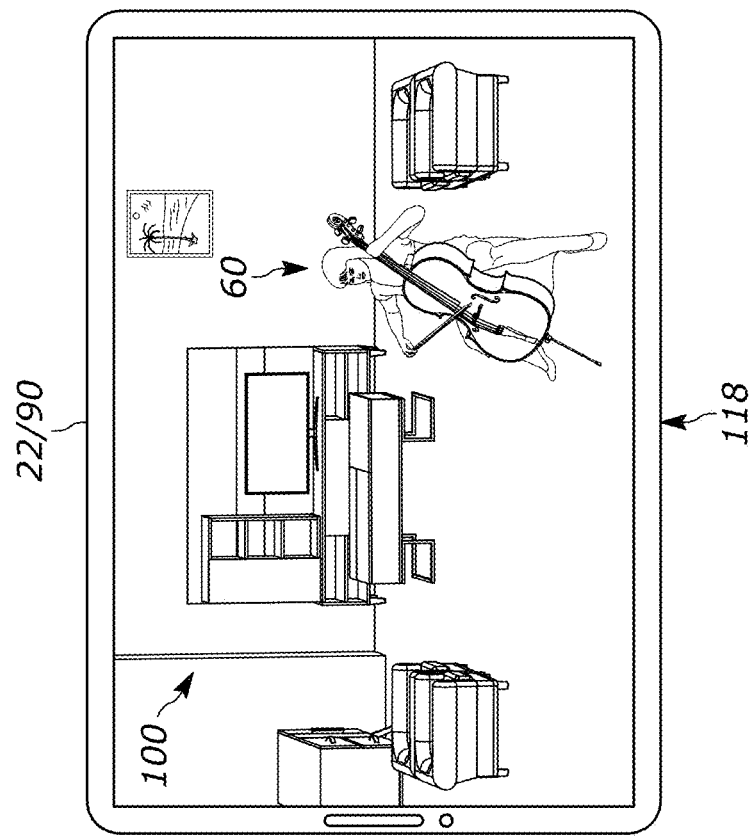
FIG. 10 is an illustration of a tablet device displaying a live augmented reality broadcast from two difference perspectives while the tablet device is moved within an environment according to the present disclosure.
Figure 10:
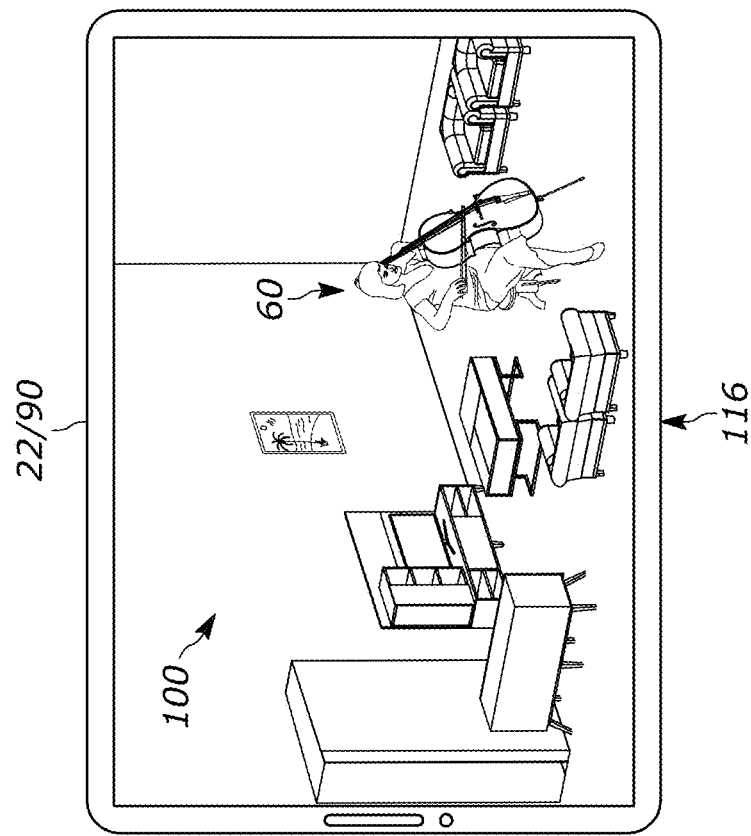

With reference to FIG. 10, the audience device 22 can be moved around the environment of the audience device 22, (for example, around the living room shown in FIG. 10) to view one or more of the 3D VR avatars 60 from different perspectives and angles. For example, as shown on the left side 116 of FIG. 10, the particular 3D VR avatar 60 is shown from a first angle with the audience member's perspective being located to the right-hand side of the 3D VR avatar 60. As shown on the right side 118 of FIG. 10, the audience device 22 has been move towards the right so that the audience member's perspective is located more towards the center and left-hand side of the 3D VR avatar 60.

Figure 11:
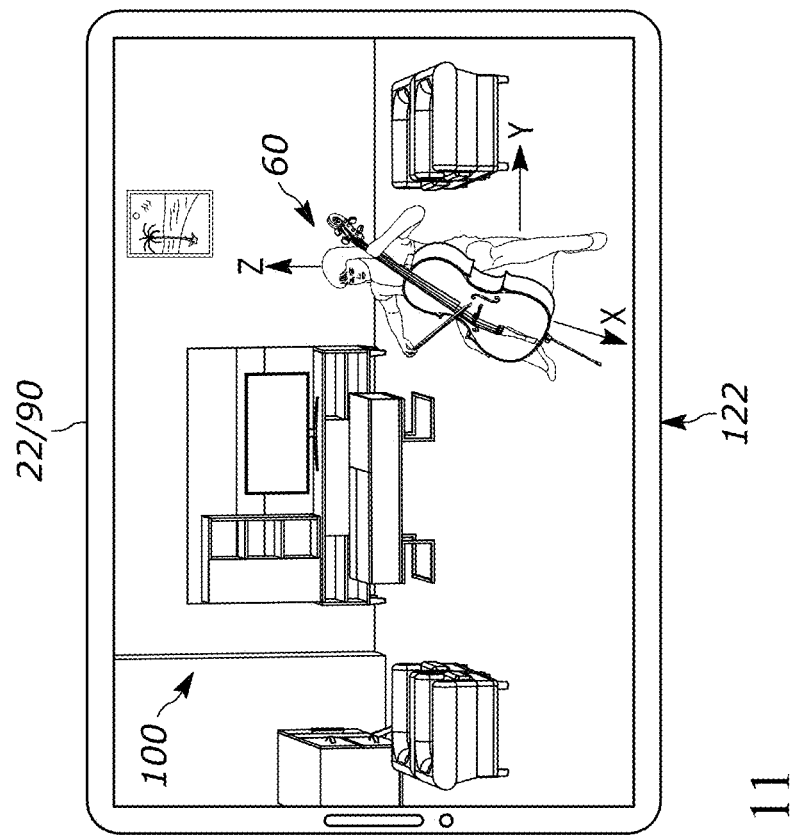
FIG. 11 is an illustration of a tablet device displaying a live augmented reality broadcast utilizing a rotational feature to rotate a performer within an environment of the live augmented reality broadcast according to the present disclosure.
Figure 11:
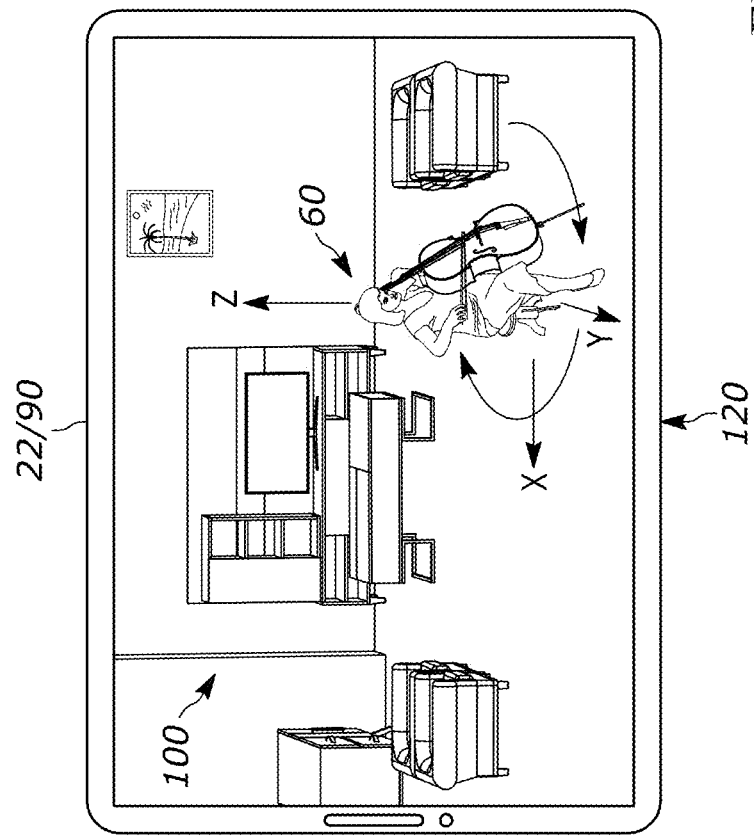

Additionally or alternatively, with reference to FIG. 11, instead of rotating the audience device 22 around the environment to view the particular 3D VR avatar 60, the particular 3D VR avatar 60 can be selected and rotated within the AR environment 100. For example, on the left side 120 of FIG. 11, the particular 3D VR avatar 60 is shown facing a first direction within the AR environment 100. On the right side 122 of FIG. 11, the particular 3D VR avatar 60 has been selected and rotated around so that the particular 3D VR avatar 60 is facing a second direction rotated from the first direction.

While a single 3D VR avatar 60 is shown in FIG. 10 and FIG. 11, the same functionality can be implemented and performed with multiple 3D VR avatars 60 within the AR environment 100.

Figure 12:
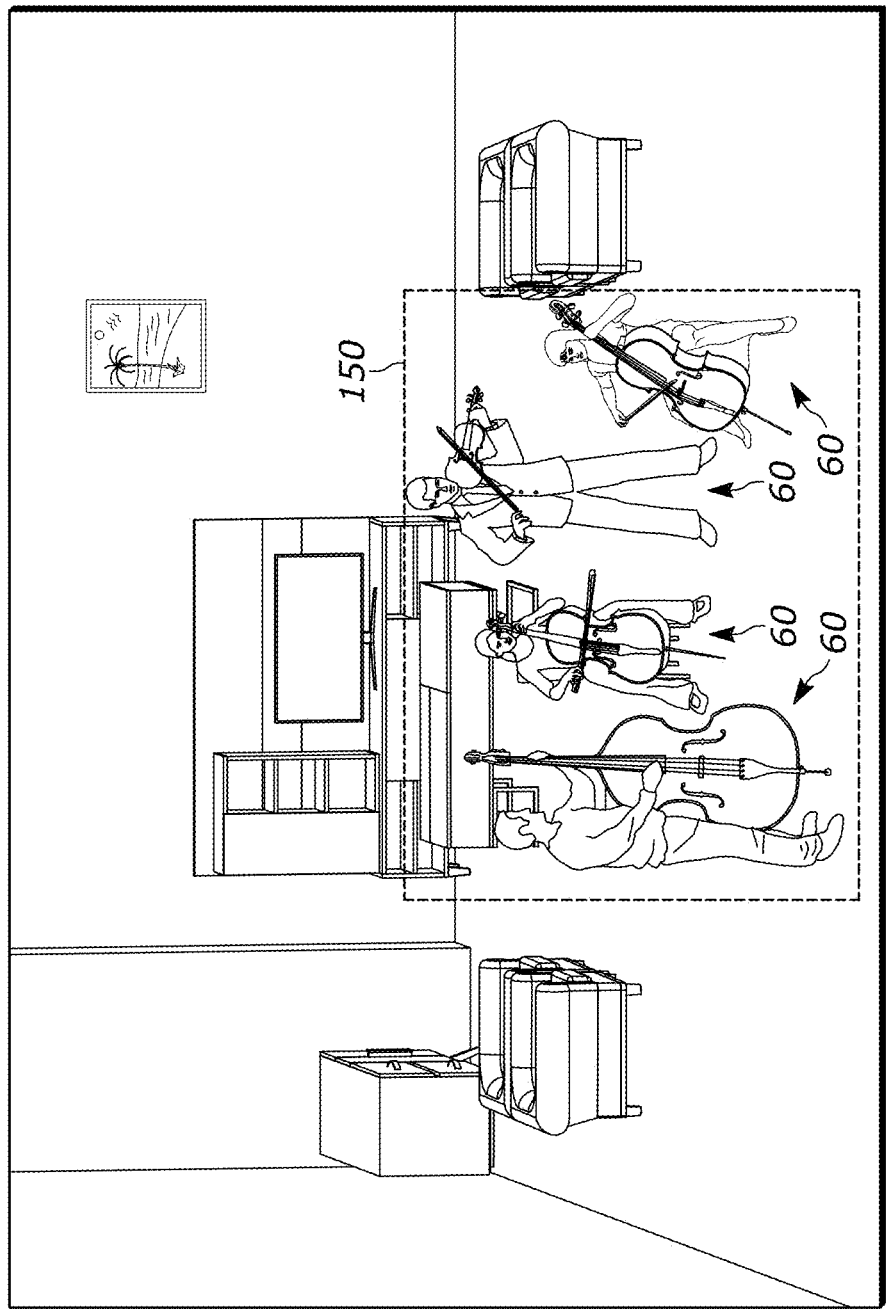
FIG. 12 is an illustration of a holographic device displaying a live augmented reality broadcast according to the present disclosure

In other features, and in another alternative embodiment, instead of displaying the 3D VR avatars 60 on a computing device having a 2D display, the audience device can instead be a holographic display system whereby the 3D VR avatars 60 are displayed as holograms by outputting live holographic data within the environment of the audience device. For example, with reference to FIG. 12, a holographic screen 150 is shown whereby a holographic display device is utilized to display the 3D VR avatars 60 as holograms via live holographic data on the holographic screen 150. As in the preceding embodiments, the audience device 22 also includes a speaker to output audio data synchronized with the body movement data and facial expression data so that the 3D VR avatars 60 displayed as holograms on the holographic screen 150 are shown performing in synchronization with the audio data.

In addition, instead of a holographic screen, the audience device can includes a volumetric display such that the live holographic data is displayed utilizing the volumetric display. The volumetric display, for example, can display the live holographic data utilizing particles suspended in the air of the environment and projecting the live holographic data onto the suspended particles.

Figure 13:
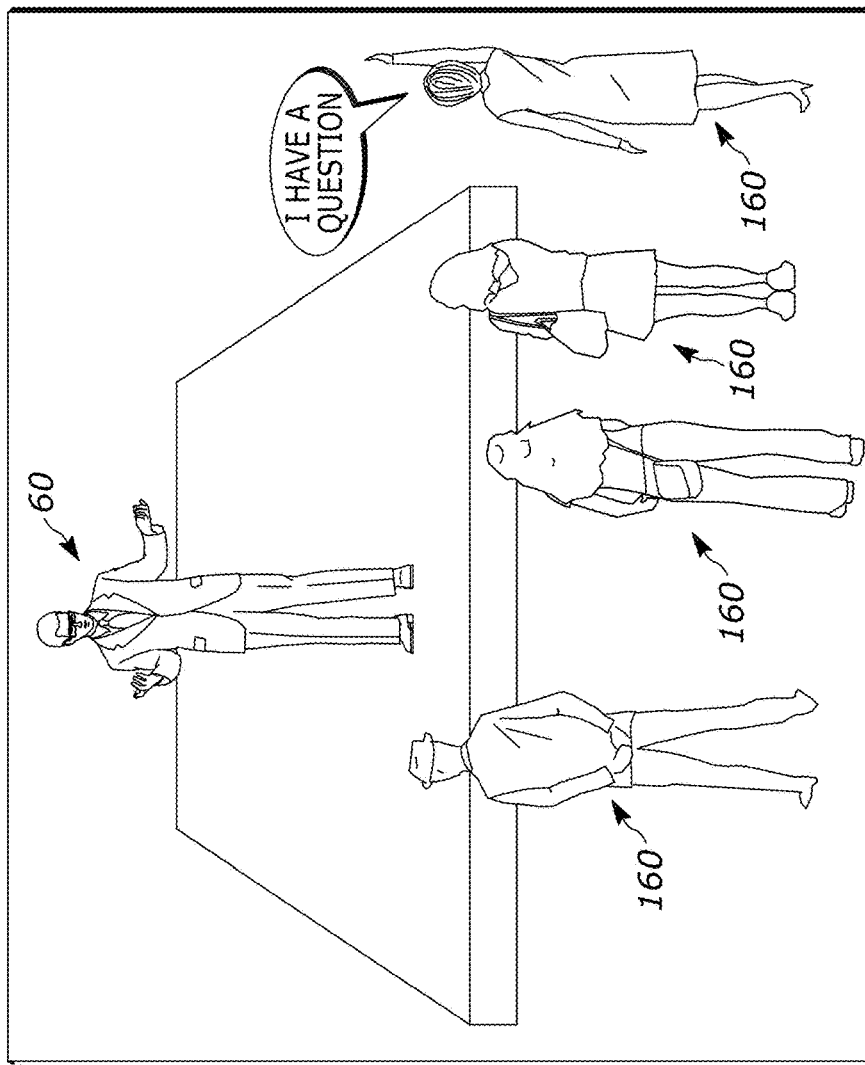
FIG. 13 is an illustration of an audience member viewing a live virtual reality broadcast in a backstage mode using a virtual reality headset according to the present disclosure.
Figure 13:
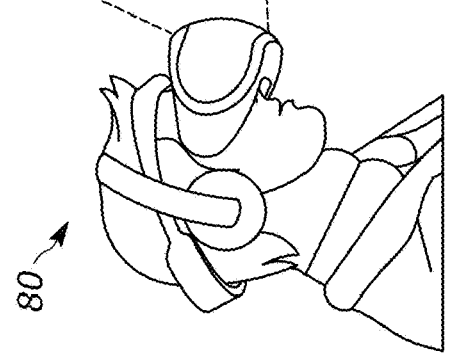

With reference to FIG. 13, the interactive virtual reality broadcast systems and methods of the present disclosure can include a backstage mode whereby an audience member 80 can engage with the 3D VR avatar 60 of a particular performer 40 to interact, ask questions, and carry on conversations with the performer. As shown in FIG. 13, an audience member 80 is viewing a VR environment whereby the 3D VR avatar 60 of a particular performer 40 is engaged in a question and answer discussion with a number of virtual audience members 160.

Figure 14:
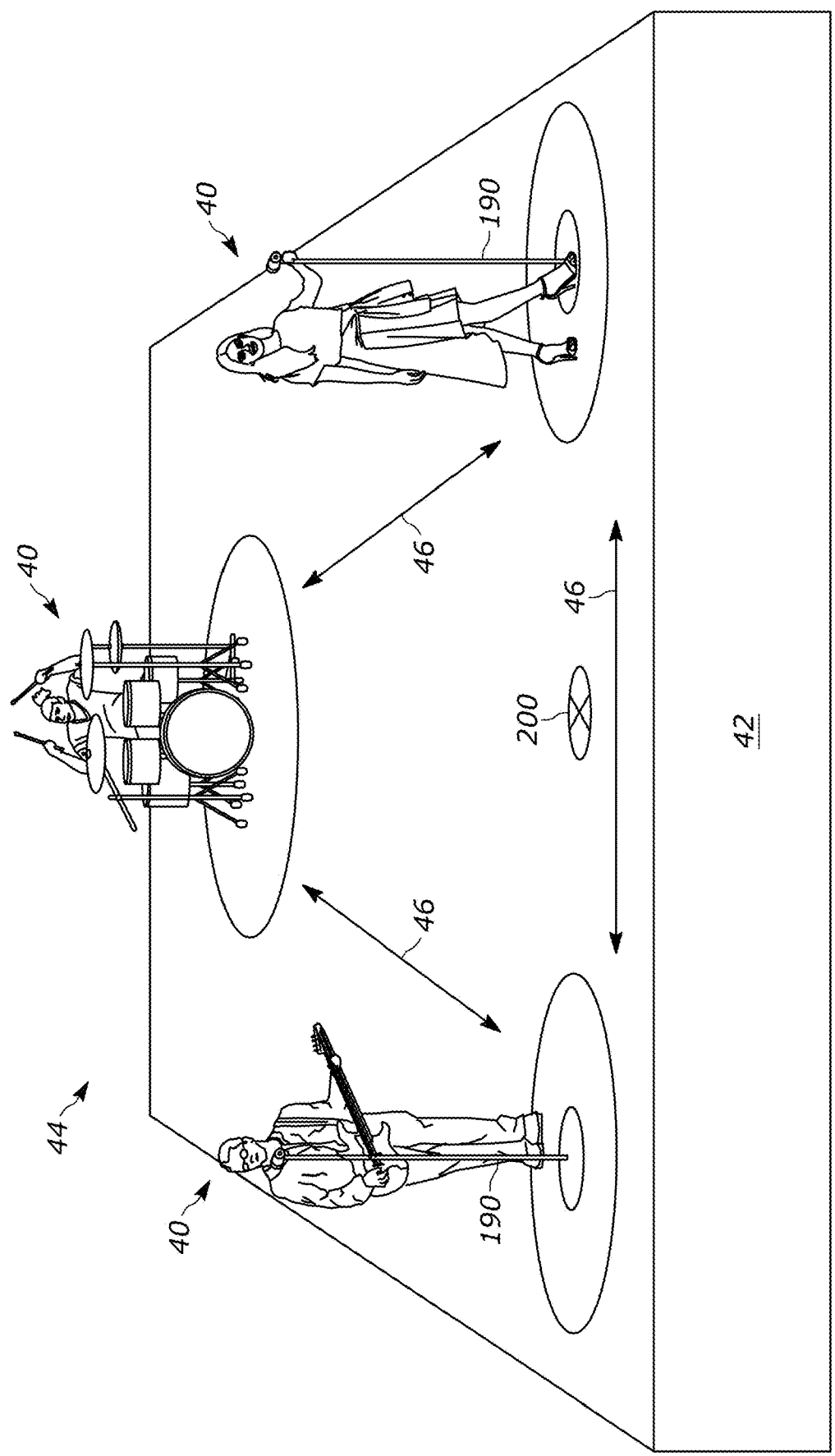
FIG. 14 is another illustration of performers located on a performance area of a concert space according to the present disclosure.
Figure 15:
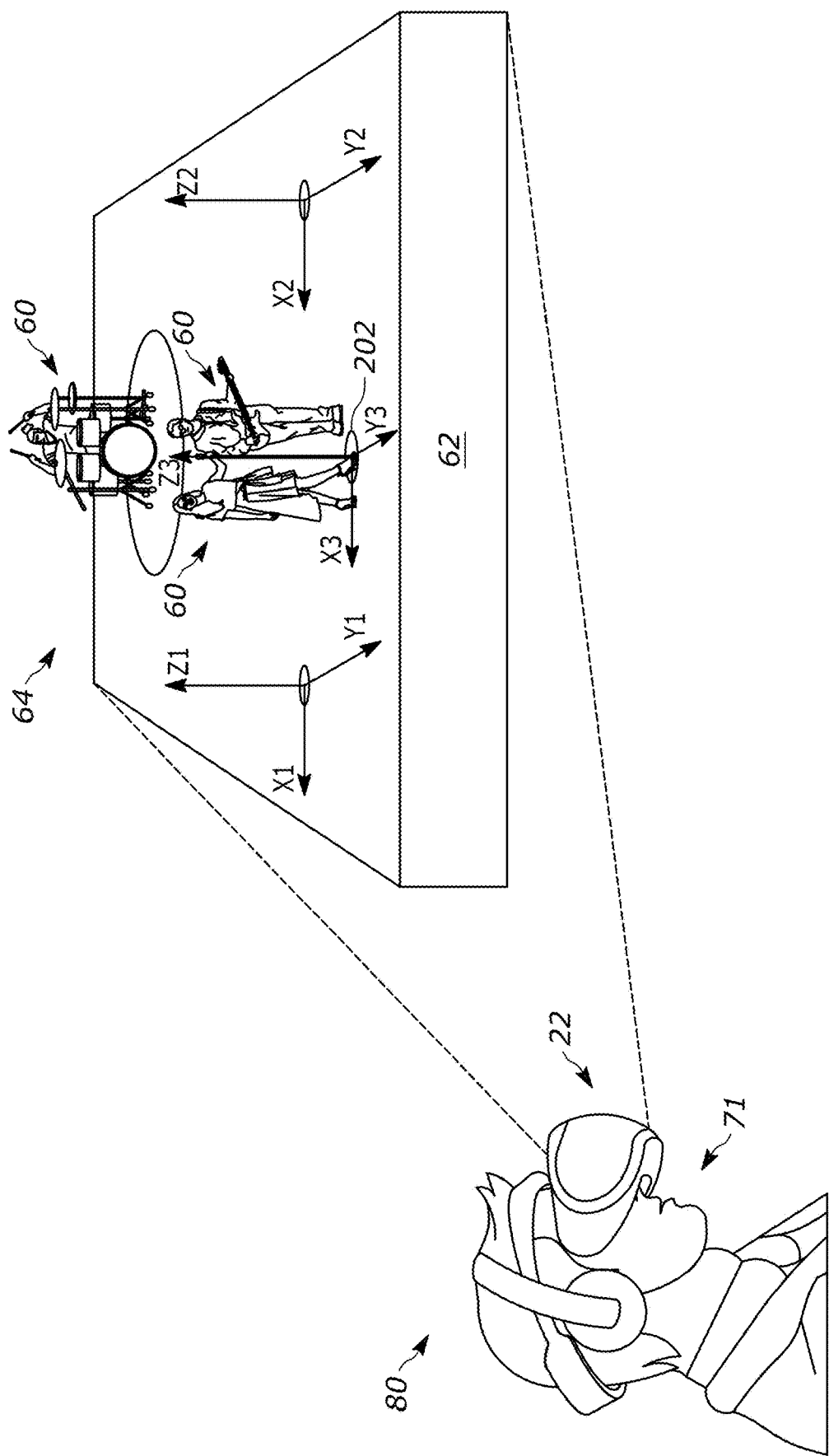
FIG. 15 is an illustration of an audience member viewing a live virtual reality broadcast using a virtual reality headset according to the present disclosure.

With reference to FIG. 14, another example of real-world performers 40 performing on a performance area 42 of a concert space 44 is shown. As with previous examples, the performers 40 are located at locations separated by a distance 46 that is larger than a predetermined distance. For example, the predetermined distance can be selected to be sufficiently large to prevent the transmission of airborne pathogens, such as viruses, between the performers 40 while the performers 40 are performing at the concert space 44. As shown in FIG. 14, two of the performers 40 are performing in front of microphones with microphone stands 190 with a predetermined location 200 between them. With reference to FIG. 15, 3D VR avatars 60 are shown performing on a VR performance area 62 within a VR concert space 64. Similar to previous examples, an audience member 80 is viewing the VR performance using an audience device 22, such as a VR headset 71. In the VR environment shown in FIG. 15, instead of the performers 40 performing at separate microphone stands, the interactive VR broadcast systems and methods of the present disclosure display the 3D VR avatars 60 performing and singing at a single microphone stand located in the virtual environment at a location corresponding to the predetermined location 200 in the real world. In other words, while the real-world performers 40 are singing and performing at different microphone stands in the real-world performance area 42 of the concert space 44 that are socially distanced, in the virtual environment the corresponding 3D VR avatars 60 are displayed as singing and performing at the same microphone stand at the same location. The 3D VR avatars 60 could be moved within the virtual environment at particular times, such as when the two performers 40 sing harmonies together during the performance, to appear as singing from the same microphone stand, while being moved apart during other times of the performance.

Figure 16:
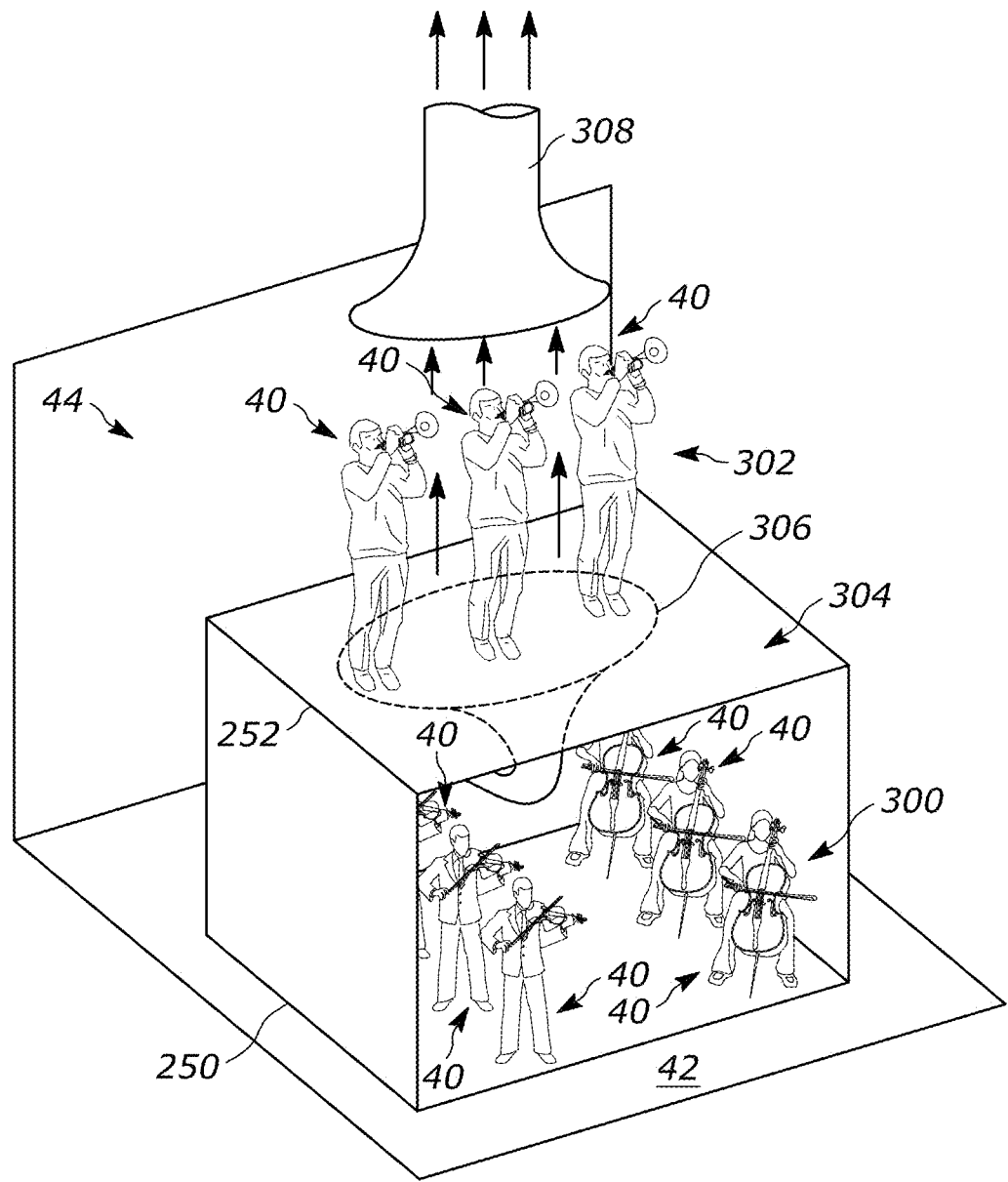
FIG. 16 is an illustration of performers located on a performance area of a concert space that includes air handling equipment that generates airflow across the concert space according to the present disclosure.

In other features, as shown in FIG. 16, the performance area 42 of the concert space 44 can include multiple tiers, including a first tier 250 and a second tier 252 located above the first tier 250. The multiple tiers 250, 252 can allow for additional locations for the performers to be located at locations that are separated by a distance that is larger than the predetermined distance. For example, a first group of performers 300 can be located on the first tier 250 while a second group of performers 302 can be located on the second tier 252. All of the performers 40 located in both groups are located at locations that are separated by a distance from other performers 40 in the same group and other performers 40 in the other group that is larger than the predetermined distance.

In addition, in the example of FIG. 16, the second tier 304 can be composed of a porous material that allows air to pass through the second tier 304. The concert space 44 can include air handling equipment that include, for example, at least one air duct 306 that directs air flow, including potentially or partially laminar air flow, from the air handling equipment through the porous floor of the second tier 304, past the performers 40 in the second group of performers 302 and into an exhaust air duct 308. In this way, the laminar air flow around the performers 40 can provide additional protection against airborne pathogens that may be present in the performance area 42. As shown in FIG. 16, the performers 40 located on the second tier can include performers 40 playing woodwind and brass instruments that require air to be blown from the performer 40.

Figure 17:
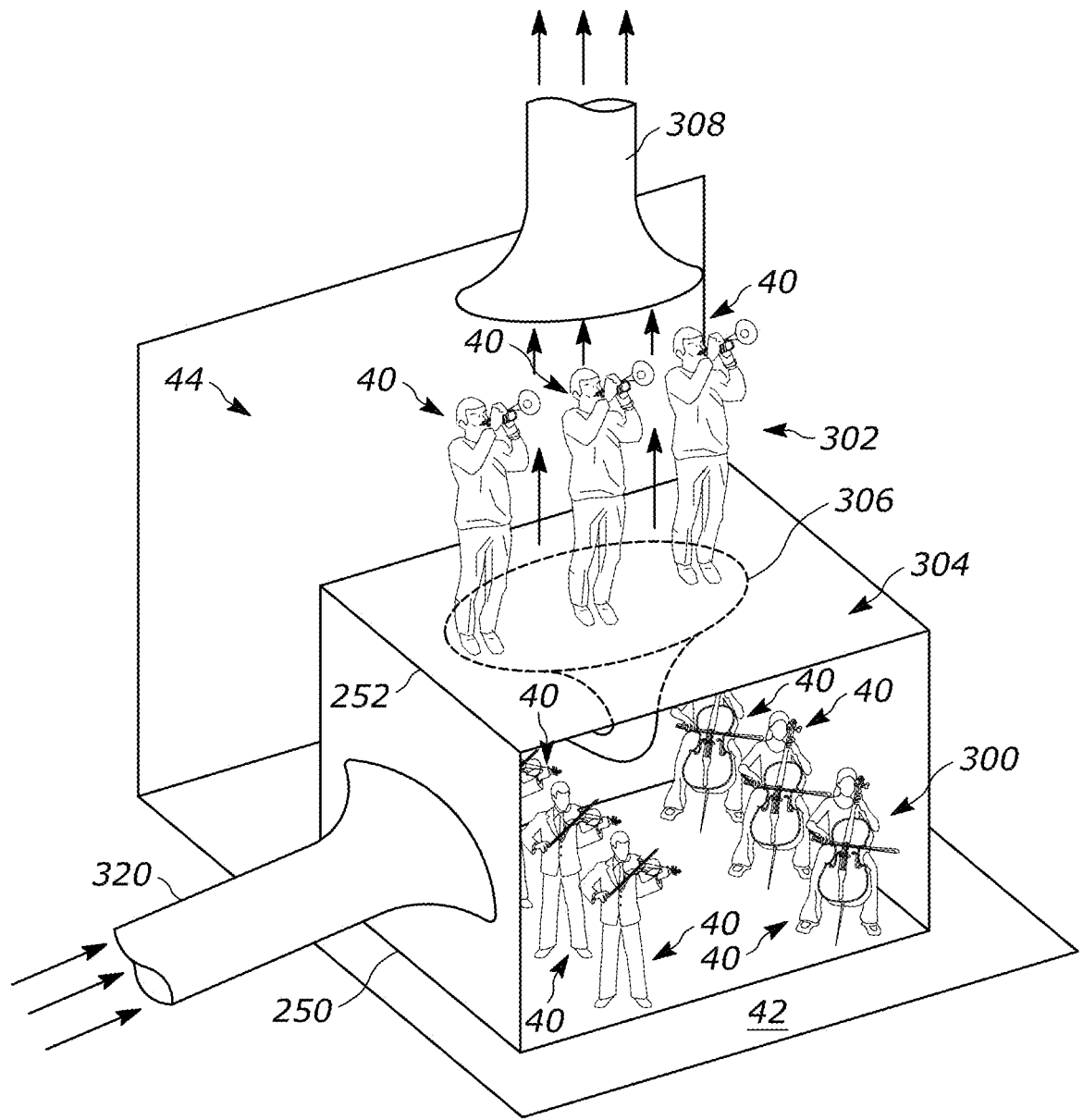
FIG. 17 is another illustration of performers located on a performance area of a concert space that includes air handling equipment that generates airflow across the concert space according to the present disclosure.

With reference to FIG. 17, in addition to the air handling equipment shown in FIG. 16, the concert space 44 can also include an additional air duct 320 that directs air flow toward the performers 40 in the first group of performers 300 and upwards through the porous floor of the second tier 304. While FIG. 16 and FIG. 17 illustrate particular examples of the air handling equipment utilizing the at least one air duct 306, the at least one additional air duct 320, and the at least one exhaust air duct 308, any number of intake and exhaust air ducts can be used in any configuration that provides air flow between and around the performers 40 to prevent the transmission of airborne pathogens between the performers while performing on stage, in accordance with the present disclosure. In this way, the use of porous stage floors with air handling equipment that provides airflow between and around the performers 40 provides further isolation and separation between the performers 40 such that any airborne pathogens from a particular performer will be captured by the air flow of the air handling equipment and directed into the at least one exhaust air duct 308 where the exhaust air can be vented outdoors. The VR system controller 12 can perform noise cancellation or filtering to remove any hum or noise generated by the air handling equipment from the audio data picked up by the microphones 14 so that the audio feed of the live VR broadcast does not include any noise from the air handling equipment.

Figure 18:
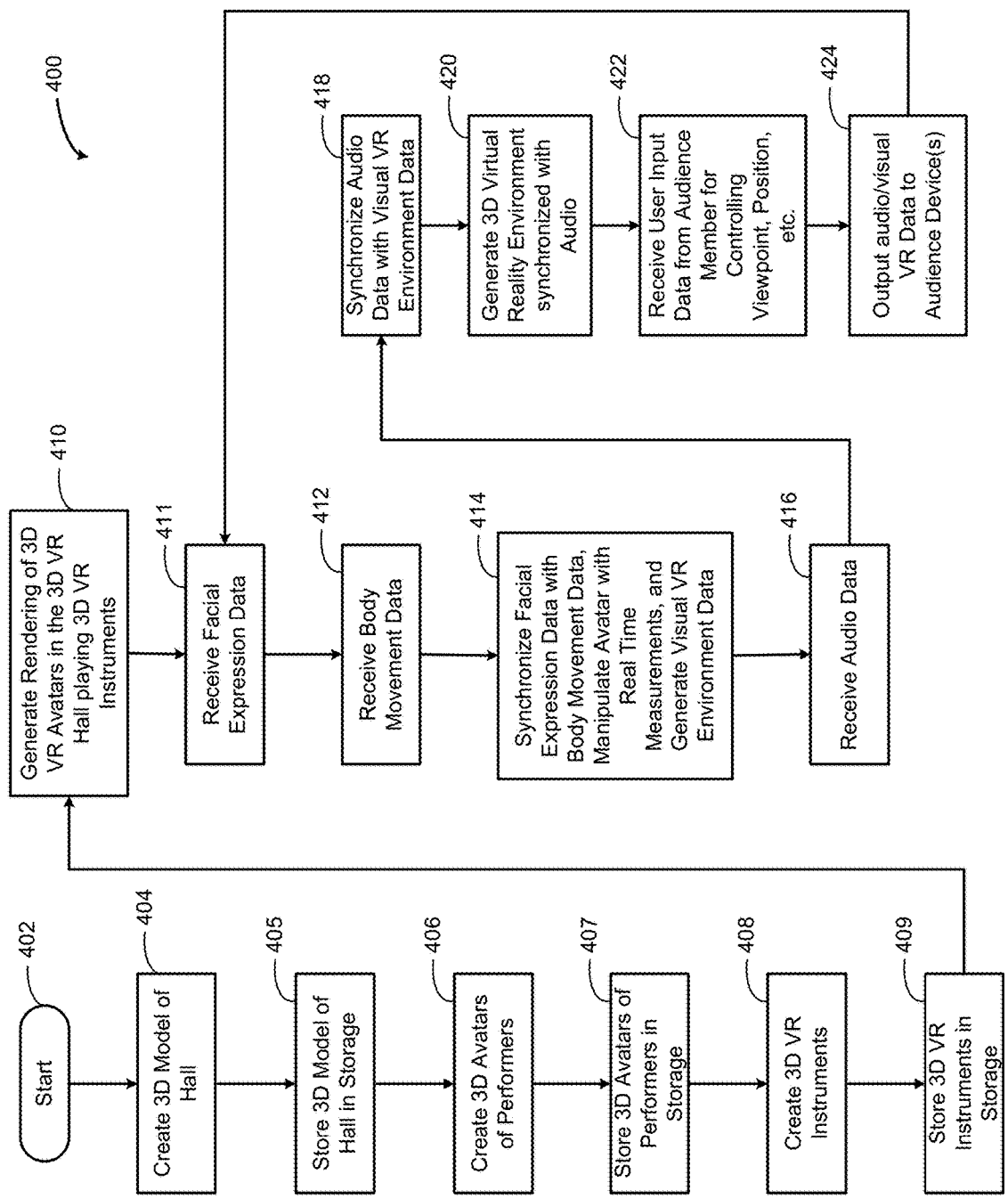
FIG. 18 is a flowchart for an interactive virtual reality broadcast method according to the present disclosure.

With reference to FIG. 18, an interactive VR broadcast method 400 in accordance with the present disclosure is shown. The method 400 can be performed by the VR system controller 12, including one or more of the individual modules 30, 32, 34, 36, and 38 of the VR system controller 12. While a specific example sequence of steps of the method is shown in FIG. 18, particular steps of the method 400 can alternatively be performed in a different order and/or in parallel with other steps.

The method 400 starts at 402. At 404, the VR system controller 12 creates a 3D model of the concert hall, i.e., the concert space 44, including the performance area 42. For example, the VR system controller can receive image data and LIDAR data for the interior of the concert space 44. For example, the image data can be generated by a 3D 360° camera that captures image data of the interior of the concert space 44 from all angles. The LIDAR data can be generated by a LIDAR unit that captures dimensional data, such as X, Y, Z coordinate data, mapping the physical characteristics, surfaces, and features of the interior of the concert space 44 in a 3D coordinate space. In this way, each physical point or area of the physical concert space 44 will have (a) associated image data generated by the 3D 360° corresponding to how the physical point or area looks within the concert space 44, and (b) associated coordinate data, represented, for example, in an X, Y, Z coordinate space, corresponding to the location of the physical point or area within the concert space 44. The VR system controller 12 can then generate 3D model of the concert hall, i.e., the concert space 44, based on the image data and the coordinate data for each physical point or area within the concert space. In other words, the VR system controller 12 can create a mapping of the image data to the associated coordinate data for each point or area within the concert space 44. The 3D 360° camera and the LIDAR unit can be positioned at a central location within the concert space 44 to capture the image data and the LIDAR data. Alternatively, the 360° camera and the LIDAR unit can capture the image or video data from multiple positions within the interior of the concert space 44 and the resulting image data and LIDAR data captured from the different positions can be stitched together. At 405, the VR system controller 12 stores the generated 3D VR model of the concert space 44, including the image data and the associated coordinate data for each point or area within the concert space 44, in the data storage 13.

At 406, the VR system controller 12 creates 3D VR avatars of the performers 40. For example, prior to any VR performance, each performance can undergo a 3D VR avatar creation process to generate a 3D VR avatar corresponding to the performer. For example, the VR system controller 12 can receive image data of the performer 40 from one or more cameras and/or LIDAR units and can generate a corresponding 3D VR avatar 60, based on the image data and/or the LIDAR data, that represents the performer 40. Alternatively, third party specialty companies can be used to generate the 3D VR avatars of the performers. For example, the Black Hangar Studios based company Metapixel, located at Lasham Airfield, Lasham, Alton Hampshire, GU34 5SS, United Kingdom, is a specialty company that utilizes 150 high resolution portable full-body scanners to capture image data of a person and create a corresponding 3D VR avatar of the person. Specifically, the company utilizes control software to enable a capture rate of 5 shots per second at 36 megapixel RAW. The company can produce a normal resolution full body scan at a rate of one every ten minutes, per station, or one every 1.5 hours at higher resolution. In this way, the 3D VR avatar of the performer will look nearly identical to the actual performer, with the same body type, face shape, eye color, hair color, hair style, etc. Additionally, or alternatively, a camera can be used to capture an image of the performer's face. The system can then use the image data of the performer's face on a default or generic avatar, which can then be edited to correspond to the actual performer's body by, for example, receiving data input indicating whether the performer is taller or shorter than the default avatar and whether the performer is skinnier or wider than the default avatar. At 407, the VR system controller 12 stores the 3D VR avatars of the performers in the data storage 13.

At 408, the VR system controller 12 generates 3D VR instruments. The 3D VR instruments can be generated with image data from cameras and/or LIDAR data from LIDAR units, similar to the 3D VR avatars generated for the performers, as discussed above. In this case, however, a standard style instruments, such as a standard style violin, can be scanned with the cameras and/or the LIDAR unit and a standard 3D VR violin can be generated based on the captured image data. That same standard 3D VR violin can then be used for any performer that utilizes a standard style violin. If a specialty or non-traditionally shaped instrument is to be used by a performer, the instrument could be scanned and a non-traditional 3D VR instrument could be generated based on the resulting image and/or LIDAR data. In addition, multiple 3D VR instruments having different types or shapes could be generated. At 409, the VR system controller 12 stores the 3D VR instruments in the instrument library in the data storage 13.

At 410, the VR system controller 12 generates an initial rendering of the 3D VR avatars 60 placed precisely within the VR concert space 64 holding their corresponding 3D VR instruments. Once the performance by the performers begins, at 411, the VR system controller 12 receives facial expression data from the facial expression sensors, as described above. At 412, the VR system controller 12 receives body movement data 412 from the body movement sensors 18, as described above. At 414, the VR system controller 414 and, more specifically, the visual input synchronization module 30 of the VR system controller, synchronizes the facial expression data with the body movement data and manipulates the 3D VR avatars 60 with real-time measurements from the facial expression sensors 16 and the body movement sensors 18 to generate visual VR environment data.

At 416, the VR system controller receives audio data from the one or more microphones 14. At 418, the VR system controller and, more specifically, the audio/visual synchronization module 34 of the VR system controller synchronizes the audio data from the one or more microphones 14 with the visual VR environment data, as discussed above. For example, the VR system controller can utilize time markers embedded within the audio data and within the visual VR environment data, for synchronization to generate synchronized audio and video data. At 420, the VR system controller 12 generates the 3D VR environment including 3D VR environment data that includes the synchronized audio/visual data showing the 3D VR avatars 60 playing their 3D VR instruments within the 3D VR concert space 44 in synchronization with the audio data so that the 3D VR performers visually appear to be playing the music of the audio data in the 3D VR environment.

At 422, the VR system controller 12 receives user input data from the audience devices 22 for controlling, for example, a viewpoint location and position within the 3D VR environment and, at 424, the VR system controller 12 outputs the audio/visual VR data to the audience devices 22. In this way, the VR system controller 12 can transmit only the data needed for the particular audience device 22 to display the visual data of the VR environment from that particular viewpoint location within the 3D VR environment. Alternatively, the VR system controller 12 can transmit the entire 3D VR environment, including all of the VR visual data for the entire VR environment, to the audience devices 22 so that the audience devices 22 can then receive the user input for controlling the viewpoint location and position within the 3D VR environment. Additionally, the VR system controller 12 can initially transmit the VR data for the VR concert space 64 and VR performance area 62, along with data for representing the 3D VR avatars 60 to the audience devices 22. The VR system controller 12 can then subsequently transmit a stream of data to the audience devices 22 that includes the real-time audio data and the real-time body movement and facial expression for the 3D VR avatars 60. In such case, the audience devices 22 can initially construct and display the VR environment with the 3D VR avatars 60 and can then update the VR environment based on the real-time body movement and facial expression data for the 3D VR avatars 60 while outputting synchronized audio data and while displaying the VR environment from the viewing location and position indicated by the user input received from the associated audience member. In other words, a central processing unit (CPU) and/or a graphics processing unit (GPU) of the audience device 22 can process and manipulate the VR environment based on input received by the audience device 22 to present the VR environment from a viewpoint position or location and/or zoom level indicated by user input received by the audience device 22. In this way, user input received by the audience device 22 indicating a viewpoint position or location need not be transmitted back to the VR system controller 12. Rather, the audience device 22 can utilize the data received from the VR system controller, including the VR data for the VR concert space 64 and VR performance area 62, the data representing the 3D VR avatars 60, the real-time audio data, and the real-time body movement and facial expression data for the 3D VR avatars 60, to manipulate and present the VR environment to the user via the visual and audio output devices of the audience devices 22 based on the viewpoint position or location and/or zoom level indicated by the user input received by the audience device. Additionally or alternatively the VR system controller 12 can utilize a separate VR distribution server that is in communication with the VR system controller 12 and the VR audience devices 22. The VR distribution server, for example, can receive the VR environment data from the VR system controller 12 and can distribute the VR environment data to the audience devices 22, as needed.

After outputting the audio/visual VR data to audience devices 22, the VR system controller 12 then loops back to 410 and receives additional facial expression data 410 and additional body movement data at 412, etc. In this way, the VR system controller 12 continues to execute the method 400 until the VR performance has concluded and/or the VR broadcast system 10 is shut down.

With reference to FIG. 20, a method 500 for generating AR data and VR data based on audience member feedback in accordance with the present disclosure is shown. The method 500 can be performed by the VR system controller 12, including one or more of the individual modules 30, 32, 34, 36, and 38 of the VR system controller 12. While a specific example sequence of steps of the method is shown in FIG. 20, particular steps of the method 500 can alternatively be performed in a different order and/or in parallel with other steps.

The method starts at 502. At 504, the VR system controller 12 receives audience member feedback from audience devices 22. For example, the audience member feedback can include audio data including audible reactions, such as cheering, whistling, etc., of the audience members during the VR performance captured by microphones 26 of the audience devices 22. Additionally, the audience member feedback can include visual data including facial expressions of the audience members captured by cameras 24 of the audience's devices 22.

At 505, the VR system controller 12 evaluates the audience feedback and filters out any audience feedback deemed to be inappropriate, including, for example, any abusive or vulgar language. The VR system controller 12 can utilize speech recognition algorithms, for example, to recognize any audible words in the audience feedback data. The recognized audible words can then be checked against a list of inappropriate words or phrases. Any words or phrases deemed in appropriate can be excised and blocked from the audio data. In the event a particular audience microphone receives inappropriate audience feedback more than a predetermined threshold number of times, the audience feedback from that particular audience microphone can be blocked for the remainder of the performance.

At 506, the VR system controller 12 generates AR data and/or VR data based on the audience member feedback data. At 508, the VR system controller 12 outputs AR data based on the audience member feedback data to the performer AR devices 28. At 510, the VR system controller 12 outputs VR data to audience members via the audience devices 22. The AR and VR data can be outputted by the VR/AR output module 36 of the VR system controller 12 to the performer AR devices 28 and to the audience devices 22. For example, as discussed above, the VR/AR output module 36 can output the audience feedback data to the audience devices 22 so that audience members 80 can hear the audible reactions of other audience members 80 watching the live VR broadcast performance and/or look around to see the real time facial expressions of other audience members 80 watching the live VR broadcast performance. For further example, as discussed above, the performers 40 can be wearing performer AR devices 28, such as the AR glasses shown in FIG. 2 and FIG. 3. The AR glasses can display visual data to display the facial expressions of one or more audience members 80 during the live VR broadcast performance. Additionally, AR glasses can include integrated speakers to output audio data based on the audience member feedback data. Alternatively, the augmented reality devices 28 can additionally include separate headphones. In each case, the VR/AR output module 36 can output the audio audience feedback data to the speakers of the AR glasses or to the separate headphones so that the performers 40 can hear the audible reactions of the audience members 80 watching the live VR broadcast performance. Additionally or alternatively, the VR/AR output module 36 can output the visual audience feedback data to a display physically located within the concert space 44. For example, the screen could be located toward a front of the performance area 42 such that the performers 40 could look up to see the facial expressions of audience members 80 displayed on the screen, while also listening to the audio data including the audible reactions of the audience members during the live VR broadcast performance.

In addition to the performer AR devices 28 and the audience devices 22, the VR broadcast system 10 can also include a separate conductor device to capture the movements, instructions, and commands of a conductor of the performers 40. For example, a video camera and a microphone can be used to capture the movements, instructions, and commands of the conductor and the resulting video and audio data can be transmitted to the performer AR devices 28 so that the performer AR devices 28 can view and follow the movements, instructions, and commands of the conductor.

In this way, the interactive VR broadcast systems and methods of the present disclosure allow performers to be socially distanced on stage, while generating and transmitting a VR environment, including avatars of the performers synced with the music being played by the performers, to audience members using virtual reality devices. In addition, the interactive VR broadcast systems and methods of the present disclosure receive and transmit audience member feedback, such as audience member video and audio data, to AR devices of the performers so the performers can receive live audience feedback during their performance and to the VR devices of other audience members. In this way, the interactive VR broadcast systems and methods of the present disclosure are able to generate similar levels of interaction and engagement that would previously have been enjoyed by musicians and audience members during traditional live musical performances, while maintaining social distance between all participants which prevents the transmission of airborne pathogens. In addition, the interactive VR broadcast systems and methods of the present disclosure can facilitate the broadcast of live performances to a geographically dispersed audience, including to any areas of the world that have a sufficient data connection to connect to and stream VR data from the VR broadcast system. Additionally, the interactive VR broadcast systems and methods of the present disclosure can facilitate the broadcast of live performances to audience members who are not able to leave their location and travel to the physical concert hall where the performance is located.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules that are connected via the communications system. For example, multiple modules may implement the same functionality distributed by a load balancing system. In a further example, the functionality of the module or controller may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method comprising:
receiving, with a virtual reality (VR) system controller, audio and visual performance data of a performance by a performer from at least one performer device;
generating, with the VR system controller, a VR broadcast based on the audio and visual performance data of the performance;
receiving, with each audience device of a plurality of audience devices, the VR broadcast, each audience device being configured to receive audience feedback data from an associated audience member,
transmitting, with each audience device of the plurality of audience devices, the audience feedback data to the VR system controller, the VR system controller being configured to synchronize the audience feedback data from each audience device with the VR broadcast to generate synchronized audience feedback data in real time such that the audience feedback data is synchronized in time with the audio and visual performance data of the performance of the VR broadcast;
transmitting, with the VR system controller, the VR broadcast with the synchronized audience feedback data to the plurality of audience devices;
receiving, with each audience device of the plurality of audience devices, the VR broadcast with the synchronized audience feedback data from each audience device;
outputting, with each audience device of the plurality of audience devices, the VR broadcast including the audio and visual performance data with the synchronized audience feedback data to the associated audience member;
receiving, with VR system controller, performer feedback data captured by the at least one performer device, the performer feedback data including audio and visual feedback data of the performer responsive to the audience feedback data;
transmitting, with the VR system controller, the performer feedback data to at least one audience device of the plurality of audience devices;
receiving, with the at least one audience device, the performer feedback data; and
outputting, with the at least one audience device, the performer feedback data to the associated audience member while the associated audience member is watching and listening to the VR broadcast.

2. The method of claim 1, wherein the audience feedback data includes at least one of audience video data that includes facial expressions of the associated audience member and audience audio data that includes audible sounds generated by the associated audience member while watching and listening to the VR broadcast.

3. A method comprising:
receiving, with a virtual reality (VR) system controller, audio data associated with at least one performer performing on a performance area of a performance space;
receiving, with the VR system controller, facial expression data from at least one facial expression sensor and body movement data from at least one body movement sensor, each facial expression sensor and each body movement sensor being associated with a performer of the at least one performer performing on the performance area of the performance space, the facial expression data from each facial expression sensor capturing facial expressions of the associated performer and the body movement data from each body movement sensor capturing body movements of the associated performer;
retrieving from a data storage, with the VR system controller, at least one previously stored three-dimensional (3D) VR avatar associated with the at least one performer and a previously stored VR performance area representing the performance area of the performance space;
generating, with the VR system controller, a 3D VR performance environment showing the at least one 3D VR avatar performing within the VR performance area, with each 3D VR avatar being manipulated to include the facial expressions and the body movements of the associated performer based on the facial expression data from the associated facial expression sensor for the associated performer and the body movement data from the associated body movement sensor for the associated performer;
generating, with the VR system controller, a VR broadcast of the 3D VR performance environment including the at least one 3D VR avatar displayed on the VR performance area and including the audio data such that the facial expressions and the body movements of the at least one 3D VR avatar are synchronized with the audio data;
transmitting, with the VR system controller, the VR broadcast to at least one audience device, each audience device outputting the VR broadcast to an associated audience member, each audience device being configured to receive visual audience feedback data from the associated audience member;
receiving, with the VR system controller, the visual audience feedback data from the at least one audience device; and
outputting, with the VR system controller, the visual audience feedback data to the at least one performer in real time while the at least one performer is performing at the performance space by displaying the visual audience feedback data on a display viewable by the at least one performer performing at the performance space.

4. The method of claim 3, wherein each audience device includes a camera and the visual audience feedback data includes facial expression data of the associated audience member captured by the camera.

5. The method of claim 3, wherein each audience device includes a microphone and is further configured to receive audio audience feedback data from the associated audience member captured by the microphone, the method further comprising:
receiving, with the VR system controller, the audio audience feedback data from the at least one audience device; and
outputting, with the VR system controller, the audio audience feedback data to the at least one performer in real time while the at least one performer is performing at the performance space by outputting the audio audience feedback data with at least one speaker to the at least one performer performing at the performance space.

6. The method of claim 3, wherein the display is included in a set of AR glasses worn by the at least one performer.

7. A method comprising:
receiving, with each audience device of a plurality of audience devices, a virtual reality (VR) broadcast transmitted from a VR system controller, each audience device having being configured to capture audience feedback data from an associated audience member, the VR broadcast including audio and visual performance data of a performance;
transmitting, with each audience device of the plurality of audience devices, the audience feedback data to the VR system controller, the VR system controller being configured to synchronize the audience feedback data from each audience device with the VR broadcast to generate synchronized audience feedback data in real time such that the audience feedback data is synchronized in time with the audio and visual performance data of the performance of the VR broadcast;
receiving, with each audience device of the plurality of audience devices, the VR broadcast with the synchronized audience feedback data from each audience device; and
outputting, with each audience device of the plurality of audience devices, the VR broadcast including the audio and visual performance data with the synchronized audience feedback data to the associated audience member, such that each audience member receives reactions of other audience members while watching and listening to the VR broadcast;
wherein each audience device includes a camera, the audience feedback data includes visual data captured by the camera, and the visual data includes facial expression data of the associated audience member captured by the camera.

8. The method of claim 7, wherein each audience device includes a microphone and the audience feedback data includes audio data captured by the microphone.

9. The method of claim 7, wherein the VR system controller is configured to generate and transmit the VR broadcast based on a real-time performance by at least one performer performing while each audience member is watching and listening to the VR broadcast.

10. The method of claim 9, further comprising outputting, with the VR system controller, the synchronized audience feedback data to the at least one performer during the real-time performance by the at least one performer.

11. A method comprising:
receiving, with a virtual reality (VR) system controller, audio data associated with at least one performer performing a performance within a performance area;
receiving, with the virtual reality (VR) system controller, facial expression data from at least one expression sensor and body movement data from a at least one body movement sensor, each facial expression sensor and each body movement sensor being associated with a performer of the at least one performer, the facial expression data from each facial expression sensor capturing facial expressions of the associated performer and the body movement data from each body movement sensor capturing body movements of the associated performer;

retrieving, with the VR system controller, at least one previously stored three-dimensional (3D) VR avatar associated with the at least one performer and a previously stored VR performance area representing the performance area from a data storage;

generating, with the VR system controller, a 3D VR performance environment showing the at least one 3D VR avatar performing within the VR performance area and with each 3D VR avatar being manipulated to include the facial expressions and the body movements of the associated performer based on the facial expression data from the associated facial expression sensor for the associated performer and the body movement data from the associated body movement sensor for the associated performer;

generating, with the VR system controller, a VR broadcast of the 3D VR performance environment including the at least one 3D VR avatar displayed on the VR performance area and including the audio data such that the facial expressions and the body movements of the at least one 3D VR avatar are synchronized with the audio data;

transmitting, with the VR system controller, the VR broadcast to at least one audience device, each audience device outputting the VR broadcast to an associated audience member;

generating, with the VR system controller, the VR broadcast for a particular audience device of the at least one audience device with audio data of the VR broadcast for the particular audience device corresponding to a particular audio stream of a plurality of audio streams, each audio stream of the plurality of audio streams corresponding to a different location of the 3D VR performance environment;

receiving, with the VR system controller, user input from the particular audience device indicating a different location within the 3D VR performance environment; and generating the VR broadcast for the particular audience device with audio data corresponding to a different audio stream of the plurality of audio streams in response to receiving the user input indicating the different location, the different audio stream being corresponding to different location within the 3D VR performance environment.

12. The method of claim 11, further comprising:
receiving, with the VR system controller, visual audience feedback data from the at least one audience device; and
outputting, with the VR system controller, the visual audience feedback data to the at least one performer in real time while the at least one performer is performing within the performance area by displaying the visual audience feedback data on a display viewable by the at least one performer performing within the performance area.

13. The method of claim 12, wherein each audience device includes a camera and the visual data includes facial expression data of the associated audience member captured by the camera.

14. The method of claim 12, further comprising:
receiving, with the VR system controller, audio audience feedback data from the at least one audience device; and
outputting, with the VR system controller, the audio audience feedback data to the at least one performer in real time while the at least one performer is performing within the performance area by outputting the audio audience feedback data with at least one speaker to the at least one performer performing within the performance area.

15. A method comprising:
receiving, with each audience device of a plurality of audience devices, a virtual reality (VR) broadcast transmitted from a VR system controller, each audience device being configured to capture audience feedback data from an associated audience member, the VR broadcast including audio and visual performance data of a performance, the VR system controller being configured to generate and transmit the VR broadcast based on a real-time performance by at least one performer performing while each audience member is watching and listening to the VR broadcast;
transmitting, with each audience device of the plurality of audience devices, the audience feedback data to the VR system controller, the VR system controller being configured to synchronize the audience feedback data from each audience device with the VR broadcast to generate synchronized audience feedback data in real time such that the audience feedback data is synchronized in time with the audio and visual performance data of the performance of the VR broadcast;
receiving, with each audience device of the plurality of audience devices, the VR broadcast with the synchronized audience feedback data from each audience device;
outputting, with each audience device of the plurality of audience devices, the VR broadcast including the audio and visual performance data with the synchronized audience feedback data to the associated audience member, such that each audience member receives reactions of other audience members while watching and listening to the VR broadcast; and
outputting, with the VR system controller, the synchronized audience feedback data to the at least one performer during the real-time performance by the at least one performer.

16. The method of claim 15, wherein each audience device includes a camera and the audience feedback data includes visual data captured by the camera.

17. The method of claim 15, wherein each audience device includes a camera and a microphone and the audience feedback data includes visual data captured by the camera and audio data captured by the microphone.

18. The method of claim 17, wherein the visual data includes facial expression data of the associated audience member captured by the camera.

* * * * *

UNITED STATES PATENT AND TRADEMARK OFFICE
CERTIFICATE OF CORRECTION

| | | |
|---|---|---|
| PATENT NO. | : 12,322,014 B2 | Page 1 of 1 |
| APPLICATION NO. | : 18/928242 | |
| DATED | : June 3, 2025 | |
| INVENTOR(S) | : Scott Reilly | |

It is certified that error appears in the above-identified patent and that said Letters Patent is hereby corrected as shown below:

In the Specification

Figure 19:
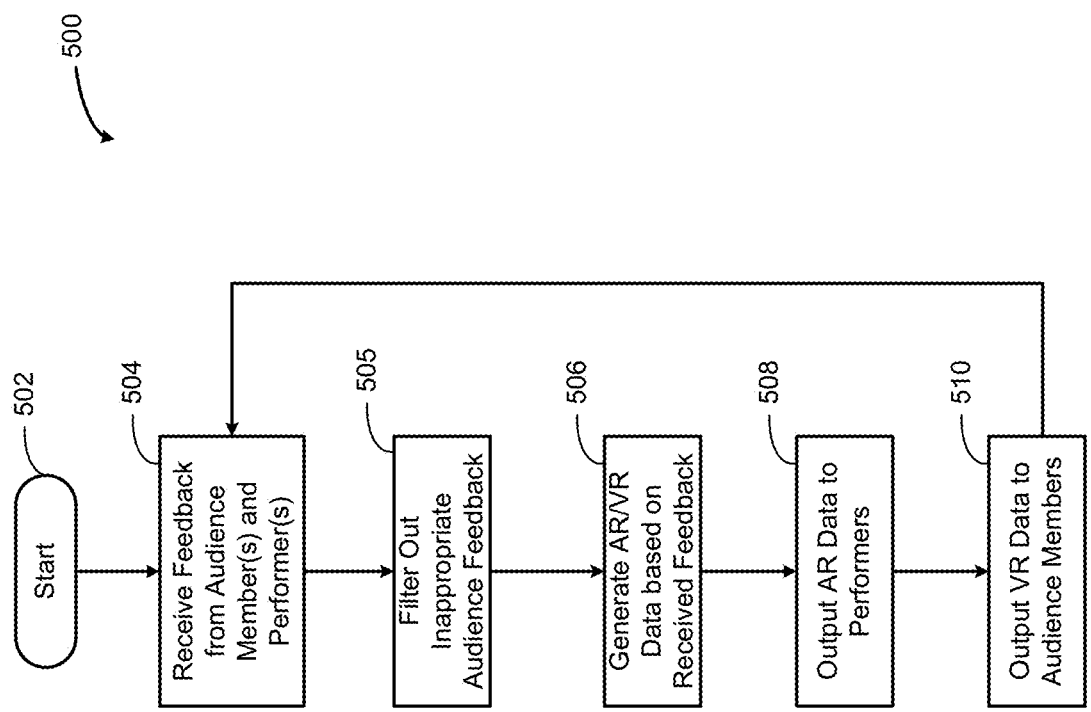
FIG. 19 is a flowchart for generating augmented reality data and virtual reality data based on audience member feedback according to the present disclosure.

Column 21, Line 45, delete "Fig. 20" and insert -- Fig. 19 -- therefore

Column 21, Line 52, delete "Fig. 20" and insert -- Fig. 19 -- therefore

Signed and Sealed this
Sixteenth Day of September, 2025

Coke Morgan Stewart
*Acting Director of the United States Patent and Trademark Office*